(12) United States Patent
Hattori et al.

(10) Patent No.: US 6,404,777 B1
(45) Date of Patent: Jun. 11, 2002

(54) NETWORK SYSTEM, BAND MANAGEMENT APPARATUS, TRANSMITTING APPARATUS, NETWORK TRANSMITTING METHOD, BAND MANAGEMENT METHOD, AND TRANSMITTING METHOD

(75) Inventors: Toshikazu Hattori, Kadoma; Susumu Ibaraki, Sakai, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/233,038

(22) Filed: Jan. 20, 1999

(30) Foreign Application Priority Data

Jan. 23, 1998 (JP) .......................... 10-011066
Dec. 24, 1998 (JP) .......................... 10-367272

(51) Int. Cl.⁷ ................................ H04J 3/16
(52) U.S. Cl. ............. 370/468; 370/231; 370/232; 370/235; 370/253; 370/401; 370/465
(58) Field of Search ............... 370/231, 235, 370/236, 237, 252, 253, 381, 412, 413, 415, 416, 417, 401, 402, 465, 468, 233, 234, 232, 230.01

(56) References Cited

U.S. PATENT DOCUMENTS 5,347,513 A * 9/1994 Abefelt et al. ............. 370/58.3
5,541,919 A * 7/1996 Yong et al. .................... 370/61
6,064,653 A * 5/2000 Farris ......................... 370/237

FOREIGN PATENT DOCUMENTS

| EP | 0 275 678 | 7/1988 | .......... H04L/11/20 |
| EP | 0 800 294 | 10/1997 | .......... H04L/12/56 |
| EP | 0 814 585 | 12/1997 | .......... H04L/12/56 |
| EP | 0 817 428 | 1/1998 | .......... H04L/12/56 |

* cited by examiner

Primary Examiner—Douglas Olms
Assistant Examiner—Shick Hom
(74) Attorney, Agent, or Firm—Wenderoth, Lind & Ponack, L.L.P.

(57) ABSTRACT

A network system includes at least one transmitting apparatus connected to a network for outputting packets containing data to the network and at least one receiving apparatus connected to the network for receiving from the network the packets that have been output from the transmitting apparatuses, the transmitting apparatuses and the receiving apparatuses making up plural transmitting/receiving systems. The network system includes a data packet monitor for monitoring the packets transmitted through the network and detecting the amount of data in the packets to be used in a specified transmitting/receiving system; and band manager for determining a bandwidth on the network to be used by the specified transmitting/receiving system, based on the amount of data in the packets that is detected by the data packet monitor.

26 Claims, 14 Drawing Sheets

Fig.6

| total data amount in cycle | number of allocated packets |
|---|---|
| 0~50 | 1/cycle |
| 51~100 | 2/cycle |
| 101~150 | 3/cycle |
| 151~200 | 4/cycle |

Fig.11

| 1 | transmission source ID | receiving destination ID |
|---|---|---|
| 2 | transmission source ID | receiving destination ID |
| 3 | transmission source ID | receiving destination ID |
| 4 | transmission source ID | receiving destination ID |
| ⋮ | ⋮ | ⋮ |
| N | transmission source ID | receiving destination ID |

Fig.12

| 1 | ID of transmitting apparatus A | ID of receiving apparatus A |
|---|---|---|
| 2 | ID of transmitting apparatus B | ID of receiving apparatus B |
| 3 | ID of transmitting apparatus A | ID of receiving apparatus A |
| 4 | ID of transmitting apparatus C | ID of receiving apparatus C |
| 5 | ID of transmitting apparatus A | ID of receiving apparatus A |
| 6 | ID of transmitting apparatus B | ID of receiving apparatus B |

NETWORK SYSTEM, BAND MANAGEMENT APPARATUS, TRANSMITTING APPARATUS, NETWORK TRANSMITTING METHOD, BAND MANAGEMENT METHOD, AND TRANSMITTING METHOD

FIELD OF THE INVENTION

The present invention relates to a network system, a band management apparatus, a transmitting apparatus, a network transmitting method, a band management method, and a transmitting method, for network data transmission.

BACKGROUND OF THE INVENTION

In recent years, systems for transmitting various types of data through a network have been widely used. One method for managing a bandwidth of a band used in plural transmitting/receiving systems uses a band management apparatus.

FIG. 10 shows a network system which uses the band management apparatus according to a prior art. Turning now to FIG. 10, reference numeral 101 designates a network, 102 designates a transmitting apparatus A, 103 designates a receiving apparatus A, 1004 designates a conventional band management apparatus, 1005 designates a conventional band management section, 106 designates an inquiry packet output unit, 108 designates a conventional processor, 109 designates a table storage unit, 110 designates a transmitting apparatus B, 111 designates a receiving apparatus B, 112 designates a transmitting apparatus C, and 113 designates a receiving apparatus C. FIG. 11 shows a table for managing the number of packets. Hereinafter, a description will be given with reference to FIGS. 10 and 11.

The table storage unit 109 holds the table shown in FIG. 11. The processor 108 sequentially reads a transmission source identifier (ID) and a receiving destination ID of a packet to be transmitted on the network from the table storage unit 109 and posts them to the inquiry packet output unit 106. The number of lines is a finite number, i.e., "N" (N: positive integer), as can be seen from the table. The IDs are sequentially read in ascending order of 1–N, and when IDs on the N-th line have been read, the same reading operation is repeated. The inquiry packet output unit 106 adds the posted IDs to an inquiry packet, and outputs the resulting inquiry packet. The transmitting apparatuses A102, B110, and C112, and receiving apparatuses A103, B111, and C113 respectively monitor the inquiry packet all the time. When a receiving apparatuses recognizes a match between the receiving destination ID of the inquiry packet and its own ID, it prepares for receiving a data packet which will be output toward the network 101 after a specified time elapses. When a transmitting apparatuses recognizes a match between the transmission source ID of the inquiry packet and its own ID, it packetizes data to-be-transmitted and then outputs the packetized data toward the network 101 after a specified time elapses. The receiving apparatus receives the packet and thereby receives the data from the transmitting apparatus. Then, the inquiry packet output unit 106 outputs a next inquiry packet. Thereafter, the operation is repeated in the same manner.

Each transmitting/receiving system uses the packets according to information contained in the table storage unit 109, and thereby the band management unit 1004 ensures the number of packets to-be-allocated for each transmitting/receiving system, i.e., a bandwidth to-be-allocated for each transmitting/receiving apparatus.

FIG. 12 shows an example of a table into which information about bandwidth allocation is entered. In FIG. 12, the number of lines on the table "N" is 6. Assume that a total bandwidth is 6 Mbps in the whole network system.

When transmission between the transmitting apparatus A and the receiving apparatus A requires 3 Mbps, as can be seen from the table in FIG. 12, three out of six are allocated for them. Likewise, when transmission between the transmitting apparatus B and the receiving apparatus B requires 2 Mbs, two out of six are allocated for them, and when transmission between the transmitting apparatus C and the receiving apparatus C requires 1 Mbps, one out of six is allocated for them. The allocation positions in the table are arbitrary. In this manner, the bandwidth to-be-allocated for each transmitting/receiving system is ensured.

A description will be given of a case where VBR (variable Bit Rate) data is transmitted from the transmitting apparatus A. In such data transmission, the bandwidth required for the VBR data dynamically changes, and therefore, packets which can be transmitted with the maximum required band are always allocated for the corresponding transmitting/receiving system, or the transmitting apparatus A102 posts the required bandwidth to the band management apparatus 1004, which dynamically changes the bandwidth to-be-allocated.

FIG. 13 is a flowchart showing a procedure for dynamically allocating the number of packets according to the prior art. In Step 1304, the transmitting apparatus A102 decides whether or not the bandwidth to-be-allocated should be changed. When decided that it should be changed, in Step 1305, the transmitting apparatus A102 posts a change request to the band management apparatus 1004. In Step 1302, the band management apparatus 1004 which has received the change request rewrites the contents of the table storage unit 109 to change the bandwidth to-be-allocated.

However, in the method in which the maximum required bandwidth is always allocated for the corresponding transmitting/receiving system, the maximum bandwidth should be ensured for a time period during which a small bandwidth might be necessary. For this reason, although there are free portions in the total bandwidth, another transmitting/receiving system cannot use them, which causes reduced efficiency in the use of the band. In addition, in the method in which the transmitting apparatus dynamically posts the change request, a procedure for posting the change request must be prepared for.

SUMMARY OF THE INVENTION

It is an object of the present invention to provide a network system, a band management apparatus, a transmitting apparatus, a network transmitting method, a band management method, and a transmitting method, wherein a bandwidth can be dynamically changed without the necessity of preparing for a procedure for posting a request for bandwidth change, and thereby efficiency in the use of the band is improved.

Other objects and advantages of the invention will become apparent from the detailed description that follows. The detailed description and specific embodiments described are provided only for illustration since various additions and modifications within the spirit of and scope of the invention will be apparent to those skilled in the art from the detailed description.

According to a first aspect of the present invention, a network system includes at least one transmitting apparatus connected to a network for outputting packets containing data to the network and at least one receiving apparatus connected to the network for receiving from the network the packets that have been output from the transmitting apparatuses. The transmitting apparatuses and the receiving apparatuses make up plural transmitting/receiving systems. The network system comprises: data packet monitoring means for monitoring the packets transmitted through the network and detecting the amount of data in the packets to be used by a specified transmitting/receiving system; and band management means for determining a bandwidth on the network to be used by the specified transmitting/receiving system, based on the amount of data in the packets that is detected by the data packet monitoring means.

According to a second aspect of the present invention, in the network system of the first aspect, the band management means holds a maximum value and a minimum value of a bandwidth to be allocated for the specified transmitting/receiving system, sets the bandwidth to be allocated for the specified transmitting/receiving system to the minimum value when the amount of data in the packet that is detected by the data packet monitoring means is zero, and sets the bandwidth to the maximum value when the amount of data in the packet is not zero.

According to a third aspect of the present invention, in the network system of the first aspect, the band management means determines cycles at regular time intervals, and controls the bandwidth to be allocated for the specified transmitting/receiving system according to the amount of data in the packets that is detected by the data packet monitoring means in one cycle.

According to a fourth aspect of the present invention, in the network system of the third aspect, the band management means adds the amount of data in the packets for the specified transmitting/receiving system that is detected by the data packet monitoring means in one cycle, increases the bandwidth to be allocated for the specified transmitting/receiving system when the addition result is larger than that in a previous cycle, and reduces the bandwidth when the addition result is smaller than that in the previous cycle.

According to a fifth aspect of the present invention, in the network system of the third aspect, the band management means includes a table showing correspondences between amount of data and allocated bandwidths, adds the amount of data in the packets for the specified transmitting/receiving system that is detected by the data packet monitoring means in one cycle, finds a range in which the added amount of data lies according to the table, and changes the bandwidth according to the table immediately after detecting that the range is different from a range in which the added amount of data in a previous cycle lies.

According to a sixth aspect of the present invention, in the network system of the third aspect, the band management means holds a reference value of averaged amount of data per packet, computes the averaged amount of data per packet from the amount of data in the packets for the specified transmitting/receiving system that is detected by the data monitoring means in one cycle, increases the bandwidth to be allocated for the specified transmitting/receiving system when the computed averaged amount of data is not smaller than the reference value, and reduces the bandwidth when the computed averaged is smaller than the reference value.

According to a seventh aspect of the present invention, in the network system of the third aspect, the band management means holds a reference value of the amount of data per packet, increases the bandwidth to be allocated for the specified transmitting/receiving system when the amount of data in the last packet for the specified transmitting/receiving system that is detected by the data packet monitoring means in one cycle is not smaller than the reference value, and reduces the bandwidth when the amount of data is smaller than the reference value.

According to an eighth aspect of the present invention, in the network system as defined in any of the third to seventh aspects, the transmitting apparatus comprises a data input unit for inputting data; a buffer for temporarily storing data input from the data input unit; and a packet creating unit for controlling the amount of data to be written onto a packet according to the amount of data stored in the buffer when the data is read from the buffer and written onto the packet, and the resulting packet is output toward the network.

According to a ninth aspect of the present invention, in the network system of the eighth aspect, the packet creating unit holds an upper limit value of the amount of data to be written onto the packet and a threshold of the amount of data to be stored in the buffer, and writes data of the amount of the upper limit value or more onto the packet when the amount of data to be stored in the buffer is not smaller than the threshold, and the band management apparatus, immediately after detecting at least one packet containing data of the amount of the upper limit value or more for the specified transmitting/receiving system per cycle, sets the bandwidth to be allocated for the specified transmitting/receiving system to a maximum value.

According to a tenth aspect of the present invention, in the network system as defined in any of the third to eighth aspects, the band management means holds an averaged upper limit value of data contained in a packet, and sets the bandwidth to be allocated for the specified transmitting/receiving system to a maximum value immediately after the averaged amount of data per packet for the specified transmitting/receiving system in one cycle has become the averaged upper limit value or more.

According to an eleventh aspect of the present invention, a network system includes a band management apparatus as well as at least one transmitting apparatus connected to a network for outputting packets containing data to the network and at least one receiving apparatus connected to the network for receiving from the network the packets that have been output from the transmitting apparatuses. The transmitting apparatuses and the receiving apparatuses make up plural transmitting/receiving systems. The band management apparatus is included in the network system for managing a bandwidth on the network system used by at least one of the transmitting/receiving systems. The band management apparatus comprises: a data packet monitoring unit for monitoring the packets transmitted through the network and detecting the amount of data in the packets to be used by a specified transmitting/receiving system; and a band management unit for determining a bandwidth on the network to be used by the specified transmitting/receiving system, based on the amount of data in the packets that is detected by the data packet monitoring unit.

According to a twelfth aspect of the present invention, in the band management apparatus of the eleventh aspect, the band management unit holds a maximum value and a minimum value of a bandwidth to be allocated for the specified transmitting/receiving system, sets the bandwidth to be allocated for the specified transmitting/receiving system to the minimum value when the amount of data in the packet is zero, and sets the bandwidth to the maximum value when the amount of data in the packet is not zero.

According to a thirteenth aspect of the present invention, in the band management apparatus of the eleventh aspect, the band management unit determines cycles at regular time intervals, and controls the bandwidth to be allocated for the specified transmitting/receiving system according to the amount of data in the packets that is detected by the data packet monitoring unit in one cycle.

According to a fourteenth aspect of the present invention, in the band management apparatus of the thirteenth aspect, the band management unit adds the amount of data in the packets that is detected by the data packet monitoring unit in one cycle, increases the bandwidth to be allocated for the specified transmitting/receiving system when the addition result is larger than that in a previous cycle, and reduces the bandwidth when the addition result is smaller than that in the previous cycle.

According to a fifteenth aspect of the present invention, in the band management apparatus of the thirteenth aspect, the band management unit includes a table showing correspondences between amount of data and allocated bandwidths, adds the amount of data in the packets which is detected by the data packet monitoring unit in one cycle, finds a range in which the added amount of data lies according to the table, and changes the bandwidth according to the table immediately after detecting that the range is different from a range in which added amount of data in a previous cycle lies.

According to a sixteenth aspect of the present invention, in the band management apparatus of the thirteenth aspect, the band management unit holds a reference value of averaged amount of data per packet, computes the averaged amount of data per packet from the amount of data in the packets that is detected by the data packet monitoring means in one cycle, increases the bandwidth to be allocated for the specified transmitting/receiving system when the computed averaged amount of data is not smaller than the reference value, and reduces the bandwidth when the computed averaged amount of data is smaller than the reference value.

According to a seventeenth aspect of the present invention, in the band management apparatus of the thirteenth aspect, the band management unit holds a reference value of the amount of data per packet, increases the bandwidth to be allocated for the specified transmitting/ receiving system when the amount of data in the last packet for the specified transmitting/receiving system that is detected by the data packet monitoring unit in one cycle is not smaller than the reference value, and reduces the bandwidth when the amount of data is smaller than the reference value.

According to an eighteenth aspect of the present invention, in the band management apparatus as defined in any of the twelfth to seventeenth aspects, the band management unit, immediately after detecting at least one packet containing data of the amount of the upper limit value or more for the specified transmitting/receiving system per cycle, sets the bandwidth to be allocated for the specified transmitting/receiving system to the maximum value.

According to a nineteenth aspect of the present invention, in the band management apparatus as defined in any of the twelfth to seventeenth aspects, the band management unit holds an averaged upper limit value of data contained in a packet, and sets the bandwidth to be allocated for the specified transmitting/receiving system to the maximum value immediately after the averaged amount of data per packet for the specified transmitting/receiving system has become the averaged upper limit value or more.

According to a twentieth aspect of the present invention, a transmitting apparatus connected to a network for outputting a packet containing data to the network, comprises: a data input unit for inputting data; a buffer for temporarily storing data input from the data input unit; and a packet creating unit for controlling the amount of data to be written onto a packet according to the amount of data stored in the buffer when the data is read from the buffer and written onto the packet, and the resulting packet is output toward the network.

According to a twenty-first aspect of the present invention, in the transmitting apparatus of the twentieth aspect, the packet creating unit holds an upper limit value of the amount of data to be written onto a packet and a threshold of the amount of data to be stored in the buffer, and writes data of the amount of the upper limit value or more onto the packet when the amount of data to be stored in the buffer is not smaller than the threshold.

A twenty-second aspect of the present invention is drawn to a network transmitting method in a network system, which includes at least one transmitting apparatus connected to a network for outputting packets containing data to the network and at least one receiving apparatus connected to the network for receiving from the network the packets that have been output from the transmitting apparatuses, wherein the transmitting apparatuses and the receiving apparatuses making up plural transmitting/receiving systems. The network transmitting method comprises monitoring the packets transmitted through the network, detecting the amount of data in the packets to be used by a specified transmitting/ receiving system, and determining a bandwidth on the network to be used by the specified transmitting/receiving system, based on the detected amount of data.

According to a twenty-third aspect of the present invention, the network transmitting method of the twenty-second aspect further comprises setting the bandwidth to be allocated for the specified transmitting/receiving system to the minimum value when the amount of data is zero, and setting the bandwidth to the maximum value when the amount of data is not zero.

According to a twenty-fourth aspect of the present invention, the network transmitting method of the twenty-second aspect further comprises determining cycles at regular time intervals each comprising at least one packet, and controlling the bandwidth to be allocated for the specified transmitting/receiving system according to the amount of data for the specified system per cycle.

According to a twenty-fifth aspect of the present invention, the network transmitting method of the twenty-fourth aspect further comprises increasing the bandwidth to be allocated for the specified transmitting/receiving system when the amount of data per cycle is larger than the amount of data in a previous cycle, and reducing the bandwidth when the amount of data per cycle is smaller than the amount in the previous cycle.

According to a twenty-sixth aspect of the present invention, the network transmitting method of the twenty-fourth aspect further comprises holding a table showing correspondences between amount of data and allocated bandwidths, computing the amount of data for the specified transmitting/receiving system per cycle, and finding the bandwidth to be allocated which is adapted to the amount of data according to the table.

According to a twenty seventh aspect of the present invention, the network transmitting method of the twenty fourth aspect further comprises holding a reference value of averaged amount of data, computing the averaged amount of data for the specified transmitting/receiving system per cycle, increasing the bandwidth to be allocated for the specified transmitting/receiving system when the computed averaged amount of data is not smaller than the reference value, and reducing the bandwidth when the computed averaged amount is smaller than the reference value.

According to a twenty-eighth aspect of the present invention, the network transmitting method of the twenty-fourth aspect further comprises holding a reference value of the amount of data per packet, increasing the bandwidth to be allocated for the specified transmitting/receiving system when the detected amount of data in the last packet for the specified transmitting/receiving system in one cycle is not smaller than the reference value, and reducing the bandwidth when the detected amount is smaller than the reference value.

According to a twenty-ninth aspect of the present invention, the network transmitting method as defined in any of the twenty-fourth to twenty-eighth aspects further comprises controlling the amount of data to be written onto a packet according to the amount of data stored in transmitting means.

According to a thirtieth aspect of the present invention, the network transmitting method of the twenty-ninth aspect further comprises, when the transmitting means transmits a packet containing data, determining an upper limit value of the amount of data written onto the packet and a threshold of the amount of data stored in the transmitting means, the transmitting means writing data of the amount of the upper limit value or more onto the packet immediately after storing data of the amount of the threshold or more therein, and setting the bandwidth to be allocated for the specified transmitting/receiving system to the maximum value when at least one packet containing data of the amount exceeding the upper limit value on the network is detected in one cycle.

According to a thirty-first aspect of the present invention, the network transmitting method as defined in any of the twenty-fourth to twenty-ninth aspects, further comprises determining an averaged upper limit value of the amount of data contained per packet, and immediately after the amount of data per packet for the specified transmitting/receiving system in one cycle has become the averaged upper limit value or more, setting the bandwidth to be allocated for the specified transmitting/receiving system to the maximum value.

A thirty-second aspect of the present invention is drawn to a band management method in a network system which includes at least one transmitting apparatus connected to a network for outputting packets containing data to the network and at least one receiving apparatus connected to the network for receiving from the network the packets that have been output from the transmitting apparatuses, wherein the transmitting apparatuses and the receiving apparatuses making up plural transmitting/receiving systems. The band management method for managing a bandwidth on the network used by at least one of the transmitting/receiving systems comprises: monitoring the packets transmitted through the network, detecting the amount of data in the packets to be used by a specified transmitting/receiving system, and determining a bandwidth on the network to be used by the specified transmitting/receiving system, based on the detected amount of data.

According to a thirty-third aspect of the present invention, the band management method of the thirty second aspect further comprises setting the bandwidth to be allocated for the specified transmitting/receiving system to the minimum value when the amount of data is zero, and setting the bandwidth to the maximum value when the amount of data is not zero.

According to a thirty-fourth aspect of the present invention, the band management method of the thirty-second aspect further comprises determining cycles at regular time intervals each comprising at least one packet, and controlling the bandwidth to be allocated for the specified transmitting/receiving system according to the amount of data for it per cycle.

According to a thirty-fifth aspect of the present invention, the band management method of the thirty-fourth aspect further comprises increasing the bandwidth to be allocated for the specified transmitting/receiving system when the amount of data per cycle is larger than the amount of data in a previous cycle, and reducing the bandwidth when the amount of data per cycle is smaller than the amount in the previous cycle.

According to a thirty-sixth aspect of the present invention, the band management method of the thirty-fourth aspect further comprises holding a table showing correspondences between amount of data and allocated bandwidths, computing the amount of data to be allocated for the specified transmitting/receiving system per cycle, and finding the bandwidth to be allocated which is adapted to the amount of data according to the table.

According to a thirty-seventh aspect of the present invention, the band management method of the thirty-fourth aspect further comprises holding a reference value of the averaged amount of data, computing the averaged amount of data for specified transmitting/receiving system per cycle, increasing the bandwidth to be allocated for the specified transmitting/receiving system when the averaged amount of data is not smaller than the reference value, and reducing the bandwidth when the averaged amount is smaller than the reference value.

According to a thirty-eighth aspect of the present invention, the band management method of the thirty-fourth aspect further comprises holding a reference value of the amount of data per packet, increasing the bandwidth to be allocated for the specified transmitting/receiving system when the detected amount of data in the last packet for the specified transmitting/receiving system in one cycle is not smaller than the reference value, and reducing the bandwidth when the detected amount is smaller than the reference value.

According to a thirty-ninth aspect of the present invention, the band management method as defined in any of the thirty-fourth to thirty-eighth aspects further comprises determining an upper limit value of the amount of data to be written onto a packet, and setting the bandwidth to be allocated for the specified transmitting/receiving system to the maximum value when at least one packet containing data of the amount exceeding the upper limit value is detected in one cycle.

According to a fortieth aspect of the present invention, the band management method as defined in any of thirty-fourth to thirty-eighth aspects further comprises determining an averaged upper limit value of the amount of data contained per packet, and setting the bandwidth to be allocated for the specified transmitting/receiving system to the maximum value immediately after the amount of data contained per packet for the specified system in one cycle has become the averaged upper limit value or more.

According to a forty-first aspect of the present invention, a transmitting method for transmitting a packet containing data written by a transmitting apparatus connected to a network, comprises: controlling amount of data to be written onto the packet according to the amount of data stored in the transmitting apparatus.

According to a forty-second aspect of the present invention, the transmitting method of the forty-first aspect, further comprises: when transmitting a packet containing data, determining an upper limit value of the amount of data to be written onto the packet and a threshold of the amount of data stored in transmitting apparatus, and writing data of the amount of the upper limit value or more immediately after data of the amount of the threshold or more is stored in the transmitting apparatus.

BRIEF DESCRIPTION OF THE DRAWINGS

FIG. 6 is a diagram showing an example of an allocation table.

FIG. 11 is a diagram showing a table for managing the number of packets.

FIG. 12 is a diagram showing a table for managing the number of packets.

DETAILED DESCRIPTION OF THE PREFERRED EMBODIMENT

Embodiment 1

Figure 1:
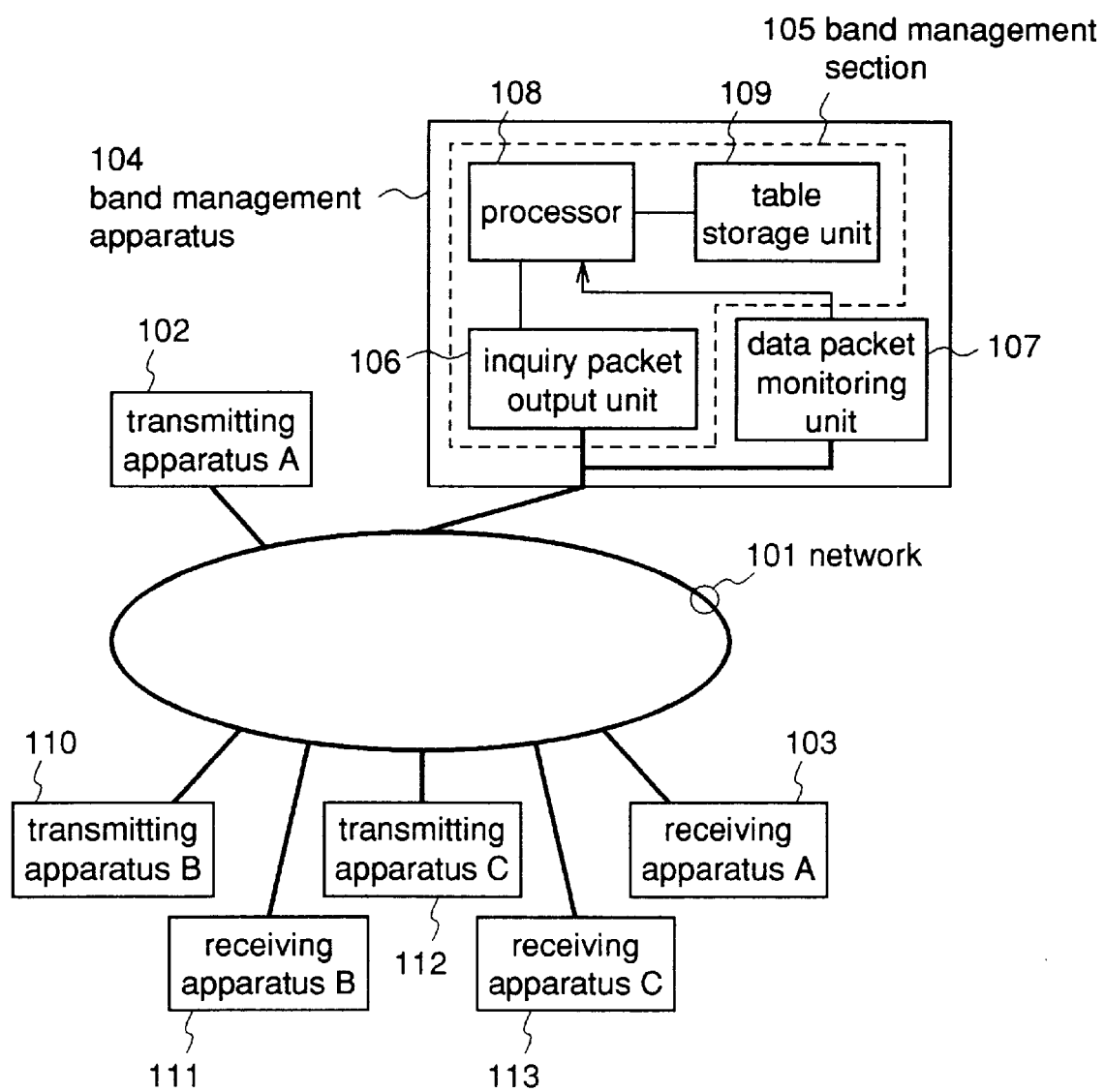
FIG. 1 is a diagram showing a network system according to first, second, and third embodiments of the present invention.

Hereinafter, a description will be given of a first embodiment of the present invention with reference to FIG. 1. FIG. 1 shows a construction of a network system according to the first embodiment of the present invention. In FIG. 1, reference numeral 101 designates a network, 102 designates a transmitting apparatus A, 103 designates a receiving apparatus A, 104 designates a band management apparatus in the network system of the first embodiment, 105 designates a band management section of the band management apparatus 104, 106 designates an inquiry packet output unit, 107 designates a data packet monitoring unit, 108 designates a processor, 109 designates a table storage unit, 110 designates a transmitting apparatus B, 111 designates a receiving apparatus B, 112 designates a transmitting apparatus C, and 113 designates a receiving apparatus C. In this first embodiment, the transmitting apparatus A 102 and the receiving apparatus A 103 make up a VBR transmitting/receiving system.

The maximum value and the minimum value of the number of packets to-be-allocated for the VBR transmitting/receiving system are defined as follows. The maximum value is the number of packets which contain data of the maximum rate in the VBR transmitting/receiving system and the minimum value is larger than "0". The processor 108 sequentially reads a transmission source ID and a receiving destination ID of a packet to-be-transmitted on the network, and posts them to the inquiry packet output unit 106. The inquiry packet output unit 106 adds the posted IDs to the inquiry packet and outputs the resulting packet. The transmitting apparatus A102 and the receiving apparatus A103 always monitor the inquiry packet. When the receiving apparatus A103 recognizes a match between the receiving destination ID and its own ID, it prepares for receiving a data packet which will be output to the network after a specified time has elapsed. When the transmitting apparatus A102 recognizes a match between the transmission source ID of the inquiry packet and its own ID, it packetizes data to-be-transmitted and then outputs the packetized data toward the network 101 after a specified time has elapsed. If there is no data to-be-transmitted, the transmitting apparatus A102 outputs an empty packet. The data packet monitoring unit 107 detects the amount of data in this packet. When the packet is empty, the number of packets to-be-allocated for the system is set to the minimum value.

On the other hand, when there is data to-be-transmitted, the transmitting apparatus A102 writes the data onto the packet and outputs the resulting packet. The data packet monitoring unit 107, upon detection of the packet onto which the data has been written, sends information indicating this to the processor 108. The processor 108 rewrites the contents of the table storage unit 109 and sets the number of the packets to the maximum value.

When the data packet monitoring unit 107 has detected a packet containing no data again, it sends information indicating this to the processor 108. The processor 108 rewrites the contents of the table storage unit 109 and sets the number of packets to the minimum value.

Figure 2:
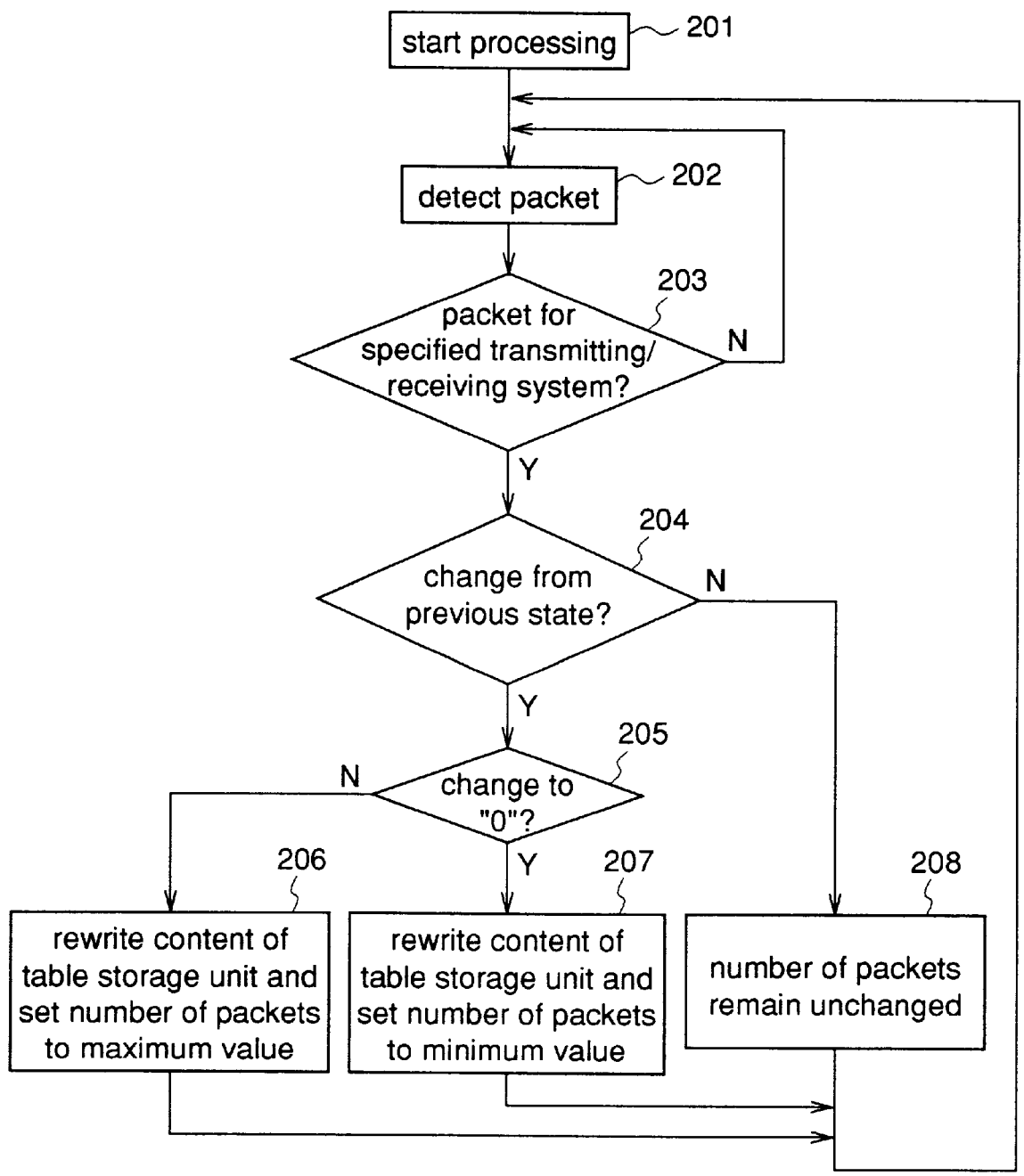
FIG. 2 is a flowchart showing band management according to the first embodiment of the present invention.

FIG. 2 shows flow of a process for deciding bandwidth switching of the first embodiment. In Step 201, processing is started. In Step 202, the band management apparatus 104 detects a data packet on the network 101. When the detected data packet is a packet for the specified transmitting/receiving system in Step S203, in Step 204, it is decided whether or not the amount of data in the packet has changed from a previous value. When decided that there is no change in Step S204, the number of the packets to be allocated is not changed. On the other hand, when decided that there is some change, it is decided whether or not the value of the amount of data has changed to "0" in Step 205. When decided that it has changed to "0" in Step 205, the content of the table is rewritten so as to set the number of the packets to the minimum value in Step 207, whereas when decided that it has changed to "a value other than 0" in Step 205, the content of the table is rewritten so as to set the number of packets to the maximum value in Step 206.

Figure 3:
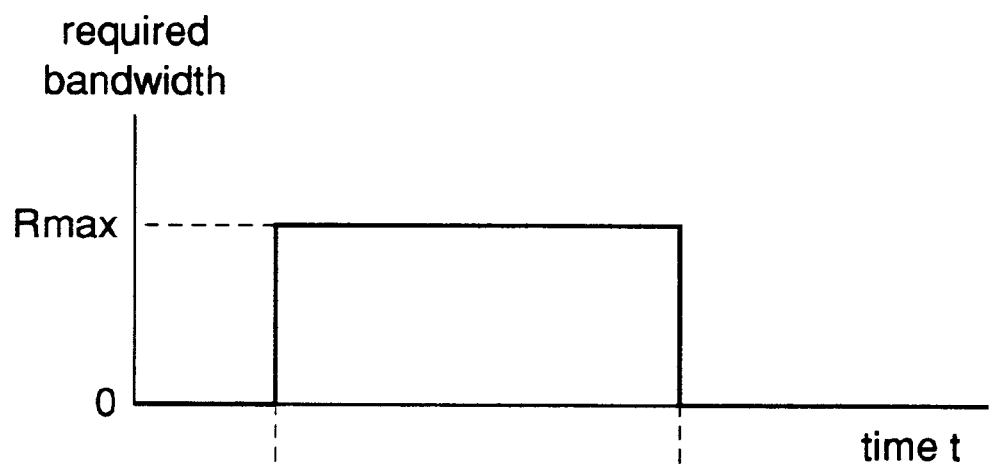
FIGS. 3(a) and 3(b) are diagrams showing an example of a bandwidth requested by the transmitting apparatus of the first embodiment and showing an example of bandwidth switching performed by the band management apparatus of the first embodiment.
Figure 3:
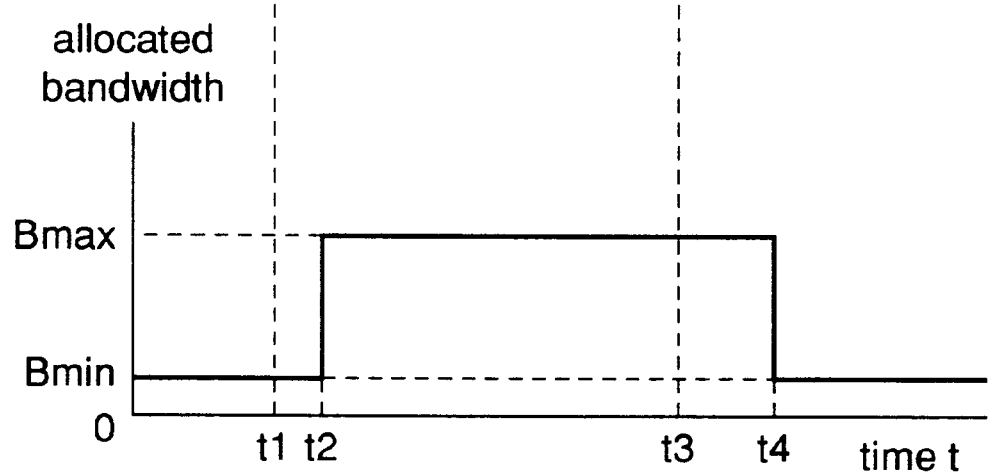

FIGS. 3(a) and 3(b) show an example of bandwidth switching of this embodiment. FIG. 3(a) shows an example of a bandwidth which is requested by the transmitting apparatus and FIG. 3(b) shows an example of bandwidth switching performed by the band management apparatus 104. In FIG. 3(a), a longitudinal axis indicates a required bandwidth, a lateral axis indicates time, and Rmax is a bandwidth of generated data. In FIG. 3(b), a longitudinal axis indicates an allocated bandwidth, a lateral axis indicates time, Bmax is a maximum value of the allocated bandwidth, and Bmin is a minimum value of the allocated bandwidth.

In this illustrated example, at time t1, the transmitting apparatus generates data to-be-transmitted. At time t1, the value of the allocated bandwidth is Bmin. When the data to-be-transmitted is generated, the transmitting apparatus A102 outputs a packet containing the data. The band management apparatus 104, immediately after detecting the packet containing the data, i.e., at t2, sets the bandwidth to-be-allocated to Bmax. At time t3, the transmitting apparatus A102 need not transmit data and therefore transmits an empty packet. The band management apparatus 104, immediately after detecting the empty packet, i.e., at time t4, sets the bandwidth to-be-allocated to Bmin.

Thus, in accordance with the first embodiment, the band management apparatus always monitors amount of data contained in the packet for the specified transmitting/receiving system, and when there is no data, it allocates the smallest number of packets, whereas when there is some data, it allocates the largest number of packets. Thereby, without the necessity of preparing for another procedure for posting the request for bandwidth change, the bandwidth to-be-allocated can be dynamically changed. Data in transition from the detection of the amount of data to the change of the bandwidth, is stored in a buffer with which the transmitting/receiving apparatus is provided. The change of amount of data is directly detected and according to the detection result, the bandwidth to-be-allocated is determined. Therefore, in contrast with processing the request for bandwidth change following another procedure, the response time is improved and fewer buffers are required. The empty bandwidth resulting from the change is used for transmission of another data, i.e., anisochronous data transmission for which the bandwidth need not be strictly ensured. As a result, efficiency in the use of the band is increased while ensuring that the maximum bandwidth is always allocated for the VBR transmitting/receiving system.

While in the first embodiment the band management apparatus outputs the inquiry packet to which the transmission ID has been added, and thereby controls the number of packets, i.e., the bandwidth to-be-allocated, another method may be employed. For instance, the band management apparatus may post a time table for packets to the transmitting apparatus, and according to the time table, the transmitting apparatus may output the packets. Also in this case, the same effects are provided by detecting amount of data, posting an updated time table to the transmitting apparatus when the amount of data has changed, and changing the bandwidth to-be-allocated by the use of the band management apparatus.

In addition, while the first embodiment uses one VBR transmitting/receiving system, two or more systems may be implemented in the same manner.

Embodiment 2

A description will be given of a network system according to a second embodiment of the present invention.

The network system of the second embodiment differs from that of the first embodiment in operation of the band management apparatus 104. Hereinafter, the description will be given with reference to FIGS. 1, 4, and 14.

Figure 14:
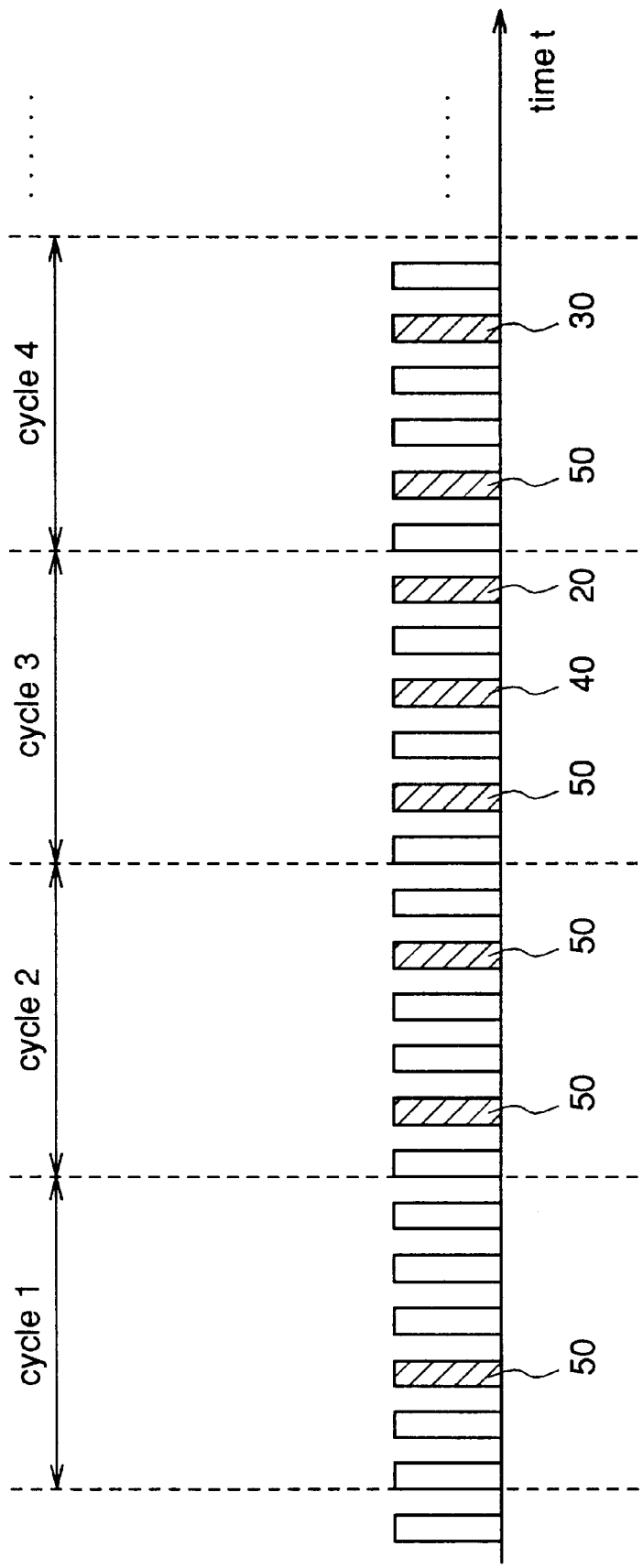
FIG. 14 is a diagram showing temporal change of the number of packets according to the second embodiment of the present invention.

In this second embodiment, the band management apparatus 104 determines cycles at regular time intervals (one or more packets) (see FIG. 14). The data packet monitoring unit 107 monitors packets for the specified transmitting/receiving system in the cycles and detects the amount of data in the packets. When all of the detected packets are full, that is, a data storage area in the packet is filled with effective data, the bandwidth to-be-allocated for the specified transmitting/receiving system is increased, otherwise, the bandwidth is reduced. When there is the upper limit value for the bandwidth to-be-allocated and the increased bandwidth exceeds the upper limit value, the value of the allocated bandwidth becomes the upper limit value. When there is the lower limit value for the bandwidth to-be-allocated and the reduced bandwidth is less than the lower limit value, the value of the allocated bandwidth becomes the lower limit value.

Figure 4:
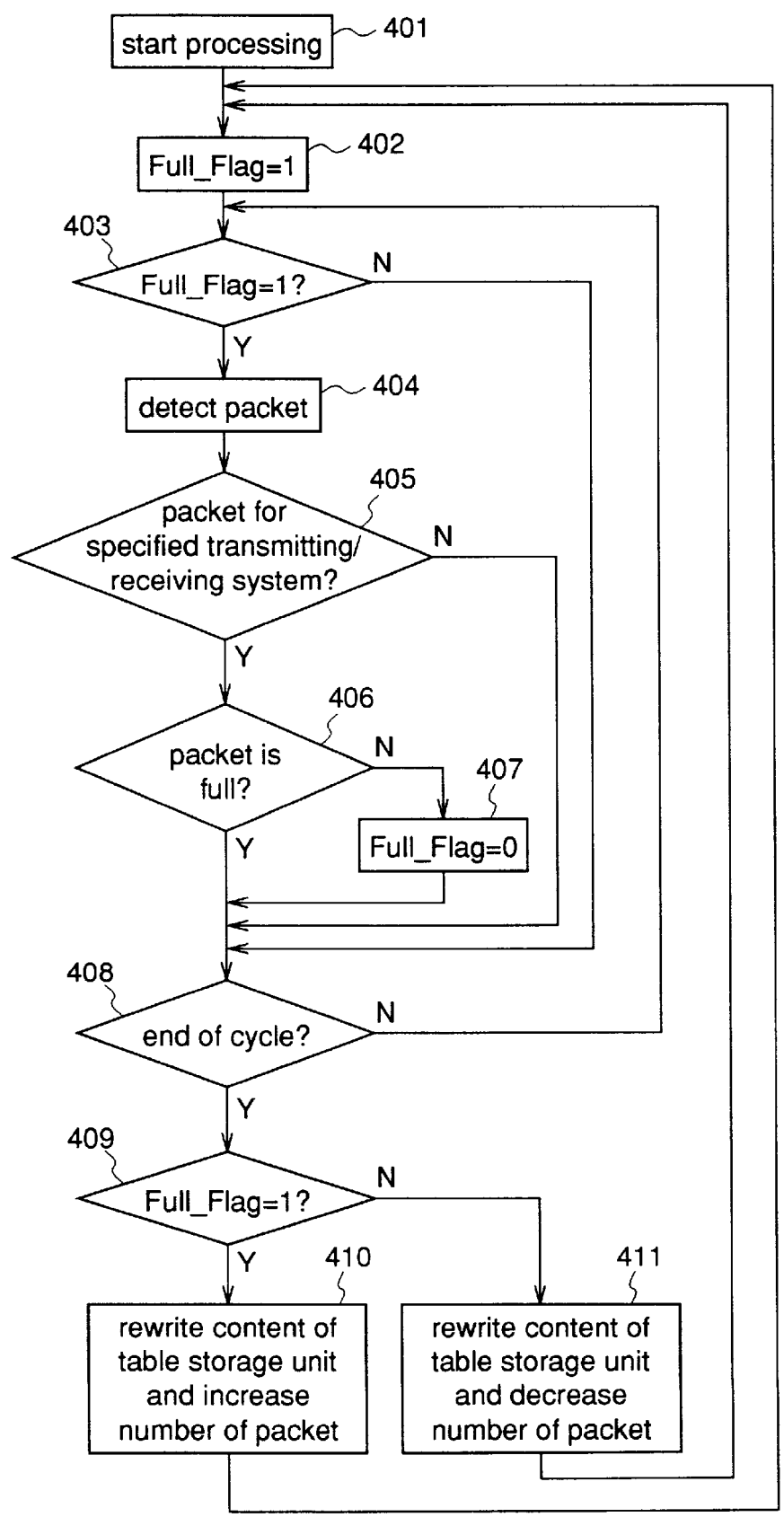
FIG. 4 is a flowchart showing bandwidth management according to a second embodiment of the present invention.

FIG. 4 shows a flow of a process for deciding bandwidth switching of the second embodiment. In Step 401, processing is started. In Step 402, the band management apparatus 104 sets Full_Flag to "1". The Full_Flag indicates the presence/absence of the packets which are not full in a cycle. In Step 403, detection of the packet is repeated when the Full_Flag is "1" in the cycle.

Subsequently in Step 404, a data packet on the network 101 is detected. When the detected data packet is a packet for the specified transmitting/receiving system in Step 405, and the packet is not full in step 406, Full_Flag is set to "0" in Step 407. This operation is repeated until the end of the cycle in step 408.

Upon completion of the cycle, the Full_Flag is checked in Step 409. When the Full_Flag is "1", the content of the table storage unit 109 is rewritten to increase the bandwidth to-be-allocated. When the increased bandwidth exceeds the upper limit value, the value of the allocated bandwidth becomes the upper limit value, in step 410. On the other hand, when Full_Flag is "0", the content of the table storage unit 109 is rewritten to reduce the bandwidth to-be-allocated. When the reduced bandwidth is less than the lower limit value, the value of the allocated bandwidth becomes the lower limit value in Step 411.

FIG. 14 shows temporal change of the number of the allocated packets. In FIG. 14, packets represented by oblique lines are packets for the VBR transmitting/receiving system and the others are packets allocated for systems other than the VBR transmitting/receiving system, a lateral axis indicates time, and numerals under the packets allocated for the VBR transmitting/receiving system indicate amount of data in the packets. Here it is assumed that one cycle is a time period for 6 packets and packets are full when the numeral indicates 50.

The band management apparatus 104 monitors data packets in a cycle for the specified transmitting/receiving system, and in the next cycle, decides the number of packets to-be-allocated. Since there is one data packet allocated for the specified transmitting/receiving system in cycle 1, and the packet is full, in cycle 2, the number of packets for the specified system is set to 2. In cycle 2, these two packets are both full, and therefore in cycle 3, the number of the packets for the specified transmitting/receiving system is set to 3. In cycle 3, since there are data packets for the specified system which are not full, in cycle 4, the number of the packets for the specified system is set to 2. Thereafter, the same operation is repeated.

Thus, in accordance with the second embodiment, the band management apparatus always monitors the amount of data in packets for the specified transmitting/receiving system, and according to the amount of data in each cycle, changes the bandwidth to-be-allocated. Thereby, without the necessity of preparing for another procedure for posting the request for bandwidth change, the bandwidth to-be-allocated can be dynamically changed. Data in transition from the detection of the amount of data to the change of the bandwidth, is stored in a buffer with which the transmitting/ receiving apparatus is provided. The change of amount of data is directly detected and according to the detection result, the bandwidth to-be-allocated is determined. Therefore, in contrast with processing the request for bandwidth change following another procedure; the response time is improved and fewer buffers are required. The empty bandwidth resulting from the change is used for transmission of another data, i.e., anisochronous data transmission for which the bandwidth need not be strictly ensured. As a result, efficiency in the use of the band is increased while ensuring that the maximum bandwidth is allocated for the VBR transmitting/receiving system.

The numeric values used in this embodiment are only illustrative and not restrictive.

While in the second embodiment the band management apparatus outputs the inquiry packet to which the transmission ID has been added, and thereby controls the number of packets, i.e., the bandwidth to-be-allocated, another method may be employed. For instance, the band management apparatus may post a time table for packets to the transmitting apparatus, and according to the time table, the transmitting apparatus may output the packets. Also in this case, the same effects are provided by detecting the amount of data, posting an updated time table to the transmitting apparatus when the amount of data has changed, and changing the bandwidth to-be-allocated by the use of the band management apparatus.

In addition, while in the second embodiment the number of packets is increased/decreased according to the number of packets in one cycle which are full, the last packet allocated for the specified transmitting/receiving system may be detected in one cycle and when it is full, the number of packets may be increased, whereas when it is not full, the number of packets may be decreased, whereby the same effects are obtained.

Besides, while in the second embodiment the number of packets is increased/decreased by one according to the number of packets in one cycle which are full, the same effects are provided regardless of whether arbitrary number of packets are increased/decreased or the numbers of the increased and reduced packets differ from each other.

Further, the following methods for increasing/decreasing the number of packets are conceived. One such method is to integrate amount of data for the specified transmitting/ receiving system in one cycle, increase the bandwidth to-be-allocated when the integration result is larger than that in a previous cycle, keep the bandwidth unchanged when there is no change between them, and reduce the bandwidth when the result is "0" or smaller than "0". Another such method is to calculate an average of the amount of data per packet detected in one cycle, increase the bandwidth when the average is not, smaller than a threshold determined by the system, and reduce the bandwidth when the average is smaller than the threshold. Also in such cases, the same effects are provided regardless of whether arbitrary number of packets are increased/reduced or the numbers of the increased and reduced packets differ from each other.

Still further, while in the second embodiment, the description has been given of one VBR transmitting/receiving system, two or more systems may be implemented in the same manner.

Moreover, while in the second embodiment, according to the comparison result of the data amount in a current cycle, the number of packets in a subsequent cycle is determined, the number of packets in a cycle which comes after the subsequent or the following cycle may be determined according to the same.

Embodiment 3

A description will be given of a network system according to a third embodiment of the present invention.

The network system of the third embodiment differs from that of the first and second embodiments in operation of the band management apparatus 104 in FIG. 1. Hereinafter, a description will be given of the network system of the third embodiment with reference to FIGS. 5, 6, and 7.

In this third embodiment, the band management apparatus 104 determines cycles at regular time intervals (one or more packets). The band management section 105 holds a table (hereinafter referred to as an allocation table) which contains the number of packets to-be-allocated for data in one cycle.

Figure 5:
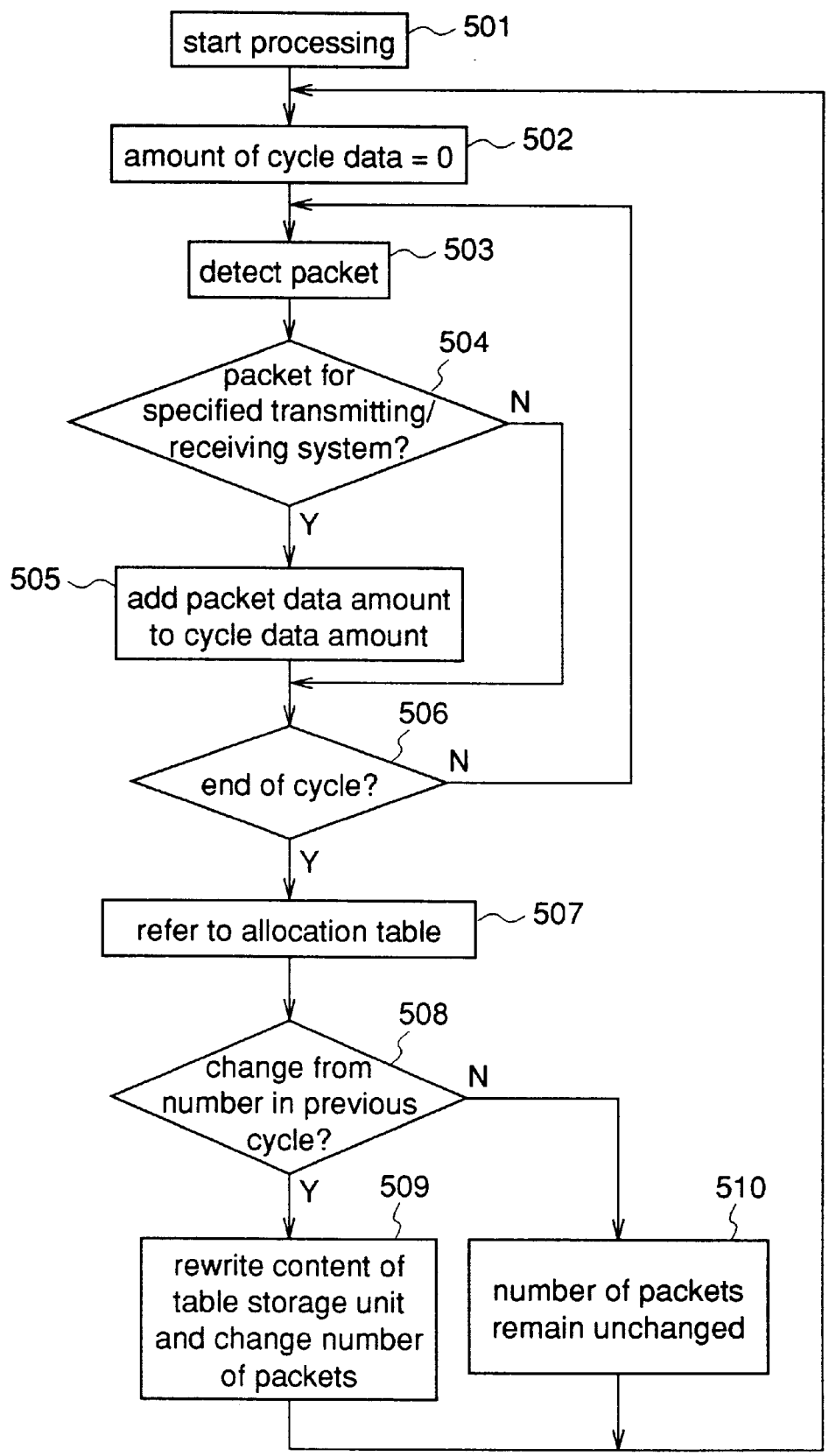
FIG. 5 is a flowchart showing bandwidth management according to a third embodiment of the present invention.

FIG. 5 shows flow of a procedure for deciding bandwidth switching of this third embodiment. In Step 501, processing is started. In Step 502, the band management apparatus 104 sets an initialization of the amount of cycle data to "0". In Step 503, the data packet on the network 101 is detected. When the detected data packet is a packet for the specified transmitting/receiving system in Step 504, the amount of the packet data is added to the amount of the cycle data in Step 505. In Step 506, this operation is repeated until the end of the cycle.

Upon completion of the cycle, in step 507, the allocation table is referred to in order to determine the number of the packets to-be-allocated from the amount of cycle data. When there is some change between the number of packets in a current cycle and the number of packets in a previous cycle in Step 508, in Step 509, the content in the table storage unit 109 is rewritten to change the number of packets. On the other hand, when there is no change between them, in Step 510, the number of packets remains unchanged.

Subsequently, a description will be given of processing data. FIG. 6 shows an example of the allocation table. As can be seen from the table, the packet allocation is as follows. When the amount of data in the detected packet is 0–50, 51–100, 101–150, and 151–200, one packet, two packets, three packets, and four packets are allocated for the transmitting/receiving system per cycle, respectively.

Figure 7:
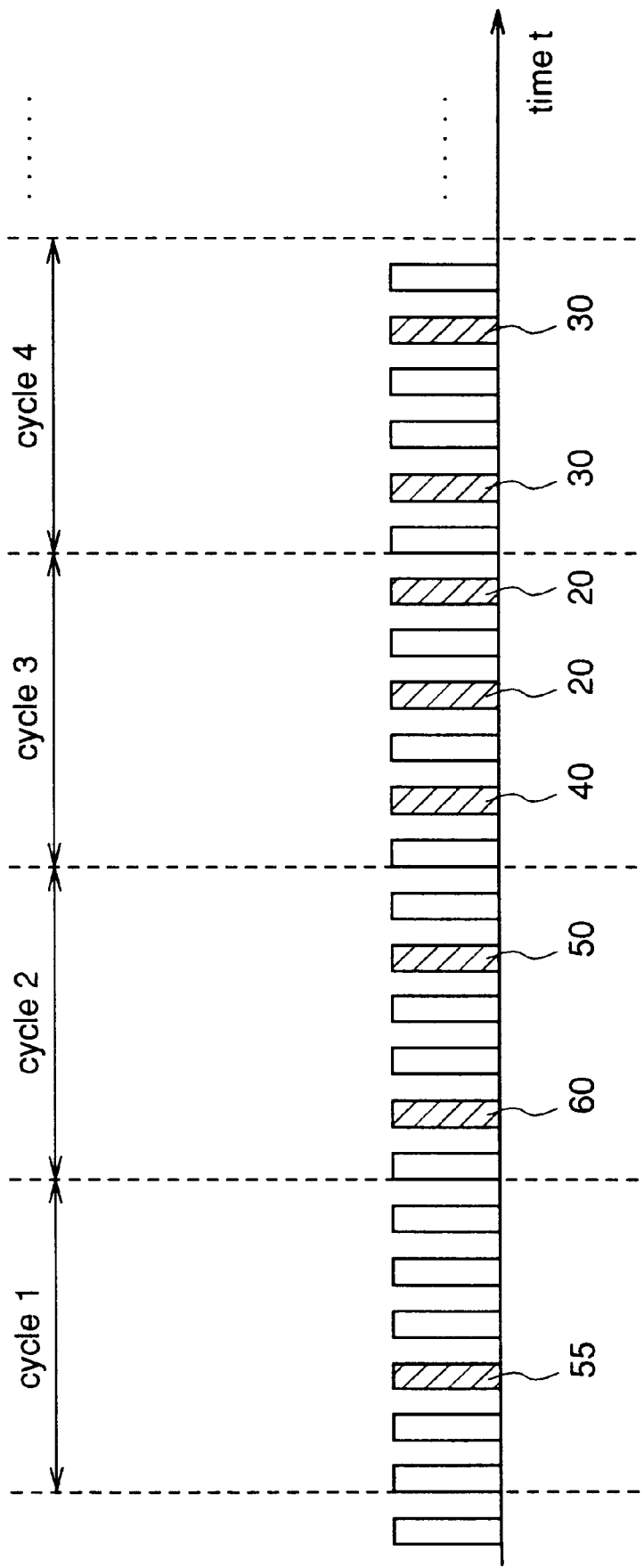
FIG. 7 is a diagram showing temporal change of the number of allocated packets according to a third embodiment of the present invention.

How the table is used will be described below with reference to FIG. 7. FIG. 7 shows temporal change of the number of allocated packets according to this embodiment.

In FIG. 7, packets represented by oblique lines are packets for the VBR transmitting/receiving system and the others are packets allocated to systems other than the VBR transmitting/receiving system, a lateral axis indicates time, and numerals under the packets allocated for the VBR transmitting/receiving system indicate amount of data in the packets. Here it is assumed that one cycle is a time period for 6 packets.

Since the amount of cycle data in cycle 1 is 55, it is decided that the number of the packets to-be-allocated in cycle 2 is "2" according to the table in FIG. 6. Likewise, since the amount of cycle data in cycle 2 is 110, it is decided that the number of packets to-be-allocated in cycle 3 is "3" according to the table in FIG. 6. Thereafter, in a like manner, the number of packets in the corresponding cycle is decided according to the table.

Thus, in accordance with the third embodiment, the band management apparatus always monitors the amount of data in the packet in the transmitting/receiving systems, and by referring to the table according to the increase/decrease in the amount of data between cycles, the bandwidth to-beallocated is changed. Thereby, without the necessity of preparing for another procedure for posting the request for bandwidth change, the bandwidth to-be-allocated can be dynamically changed. Data in transition from the detection of the amount of data to the change of the allocated bandwidth, is stored in a buffer with which the transmitting/receiving apparatus is provided. The change of amount of data is directly detected and according to the detection result, the bandwidth to-be-allocated is determined. Therefore, in contrast with processing the request for bandwidth change following another procedure, the response time is improved and fewer buffers are required. The empty bandwidth resulting from the change is used for transmission of another data, i.e., anisochronous data transmission for which the bandwidth need not be strictly ensured. As a result, efficiency in the use of the band is increased while ensuring that the maximum bandwidth is always allocated for the VBR transmitting/receiving system.

While in the third embodiment, the band management apparatus outputs the inquiry packet to which the transmission ID has been added, and thereby controls the number of packets, i.e., the bandwidth to be allocated, another method may be employed. For instance, the band management apparatus may post a time table for packets to the transmitting apparatus, and according to the time table, the transmitting apparatus may output the packets. Also in this case, the same effects are provided by detecting amount of data, posting an updated time table to the transmitting apparatus when the amount of data has changed, and changing the bandwidth to-be-allocated by the use of the band management apparatus.

While in the third embodiment, the number of packets to-be-allocated for data in one cycle is entered into the table, the number of packets to-be-allocated for the average of the amount of data (per packet) may be entered into it. In this case, the average is found in each cycle and according to the table, the number of packets is changed.

In addition, while the third embodiment uses one VBR transmitting/receiving system, two or more systems may be implemented in the same manner.

Moreover, while in the third embodiment, the number of packets in a subsequent cycle is determined with reference to the table, the number of packets in a cycle which comes after the subsequent or the following cycle may be determined with reference to the same.

Embodiment 4

A description will be given of a network system according to a fourth embodiment of the present invention. The fourth embodiment differs from the above embodiments in that the rate at which data is output from a transmitting apparatus rapidly increases. This will be described with reference to FIGS. 8, 9, and 15.

Figure 8:
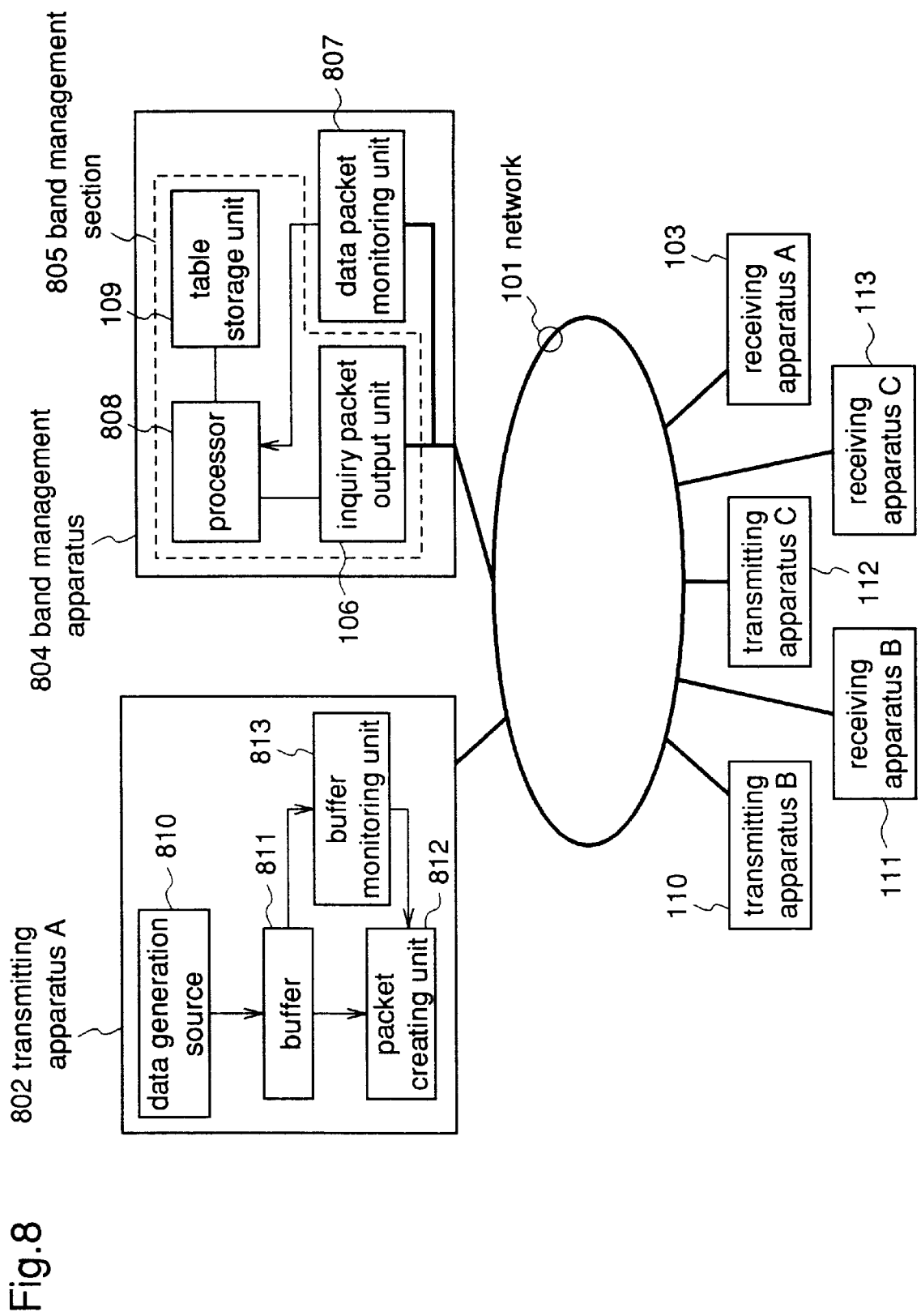
FIG. 8 is a diagram showing a network system according to a fourth embodiment of the present invention.

FIG. 8 shows a network system of the fourth embodiment. In FIG. 8, reference numeral 101 designates a network, 802 designates a transmitting apparatus A, 103 designates a receiving apparatus A, 804 designates a band management apparatus, 805 designates a band management section, 106 designates an inquiry packet output unit, 807 designates a data packet monitoring unit, 808 designates a processor, 109 designates a table storage unit, 810 designates a data generation source, 811 designates a buffer, 812 designates a packet creating unit, 813 designates a buffer monitoring unit, 110 designates a transmitting apparatus B, 111 designates a receiving apparatus B, 112 designates a transmitting apparatus C, and 113 designates a receiving apparatus C. In this fourth embodiment, the transmitting apparatus A 802 and the receiving apparatus A 103 make up the VBR transmitting/receiving system.

The processor 808 sequentially reads a transmission source ID and a receiving destination ID of a packet to be transmitted on the network, and posts them to the inquiry packet output unit 106. The inquiry packet output unit 106 adds the posted IDs to the inquiry packet and outputs the resulting packet. The transmitting apparatus A 802 and the receiving apparatus A 103 always monitor the inquiry packet. When the receiving apparatus A 103 recognizes a match between the receiving destination ID and its own ID, it prepares for receiving a data packet which will be output to the network after a specified time has elapsed. When the transmitting apparatus A 102 recognizes a match between the transmission source ID of the inquiry packet and its own ID, it packetizes data to-be-transmitted and then outputs the packetized data toward the network 101 after a specified time has elapsed. Data to-be-written is output from the data generation source 810 and is temporarily stored in the buffer 811 at an arbitrary rate. The packet creating unit 812 reads data from the buffer 811 and writes data onto the packet.

In this fourth embodiment, the packet creating unit 812 holds the upper limit value of the amount of data to be written per packet. It should be remembered that the amount of data does not exceed this upper limit value in normal transmission. The buffer monitoring unit 813 monitors the amount of data to be stored in the buffer and posts it to the packet creating unit 812. The packet creating unit 812 holds a threshold and when the posted data amount has exceeded the threshold, it writes data of the amount exceeding the upper limit value into the packet.

A description will be given of operation of the band management apparatus 804 of this embodiment.

The band management apparatus 804 determines cycles at regular time intervals (one or more packets). The data packet monitoring unit 807 detects amount of data in packets for the transmitting/receiving system. When the monitoring unit 807 has detected one or more packets (hereinafter referred to as an upper limit value packet) that contain data of the amount of the upper limit value or more in a cycle, the number of packets to-be-allocated for the specified transmitting/receiving system is set to a maximum value immediately.

Figure 9:
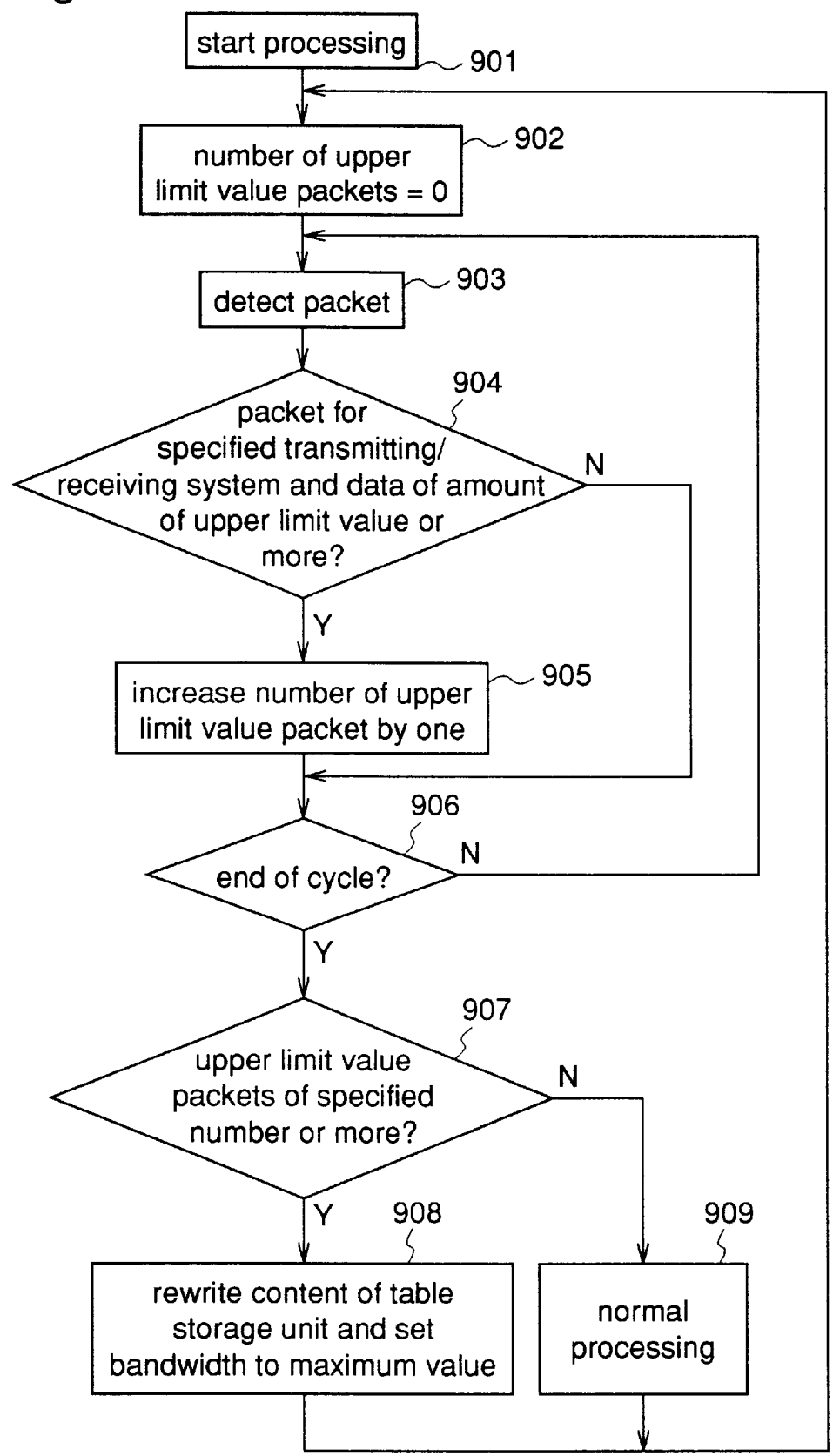
FIG. 9 is a flowchart showing a process for maximizing a bandwidth according to a fourth embodiment of the present invention.
Figure 10:
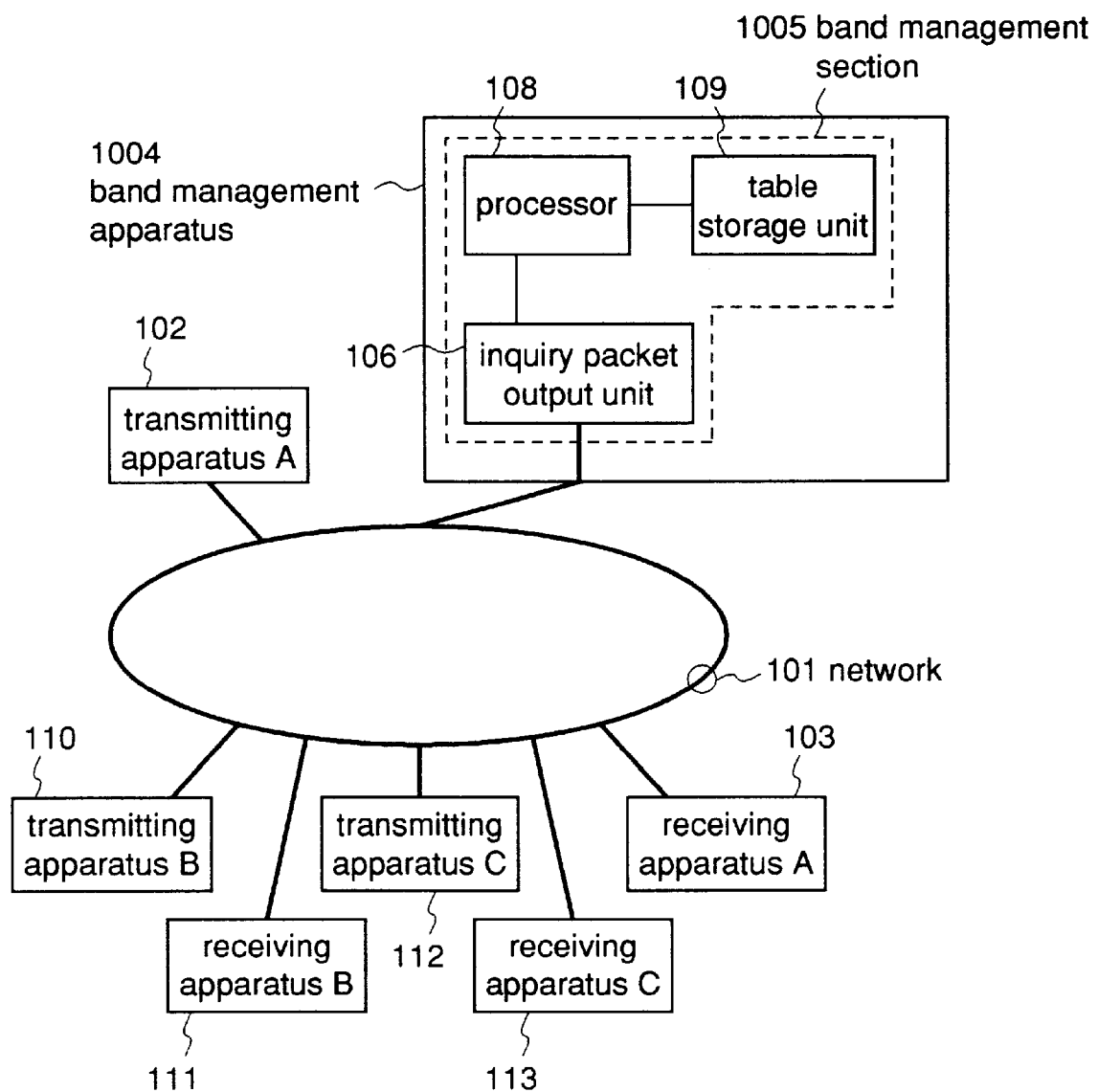
FIG. 10 is a diagram showing a network system according to a prior art.
Figure 13:
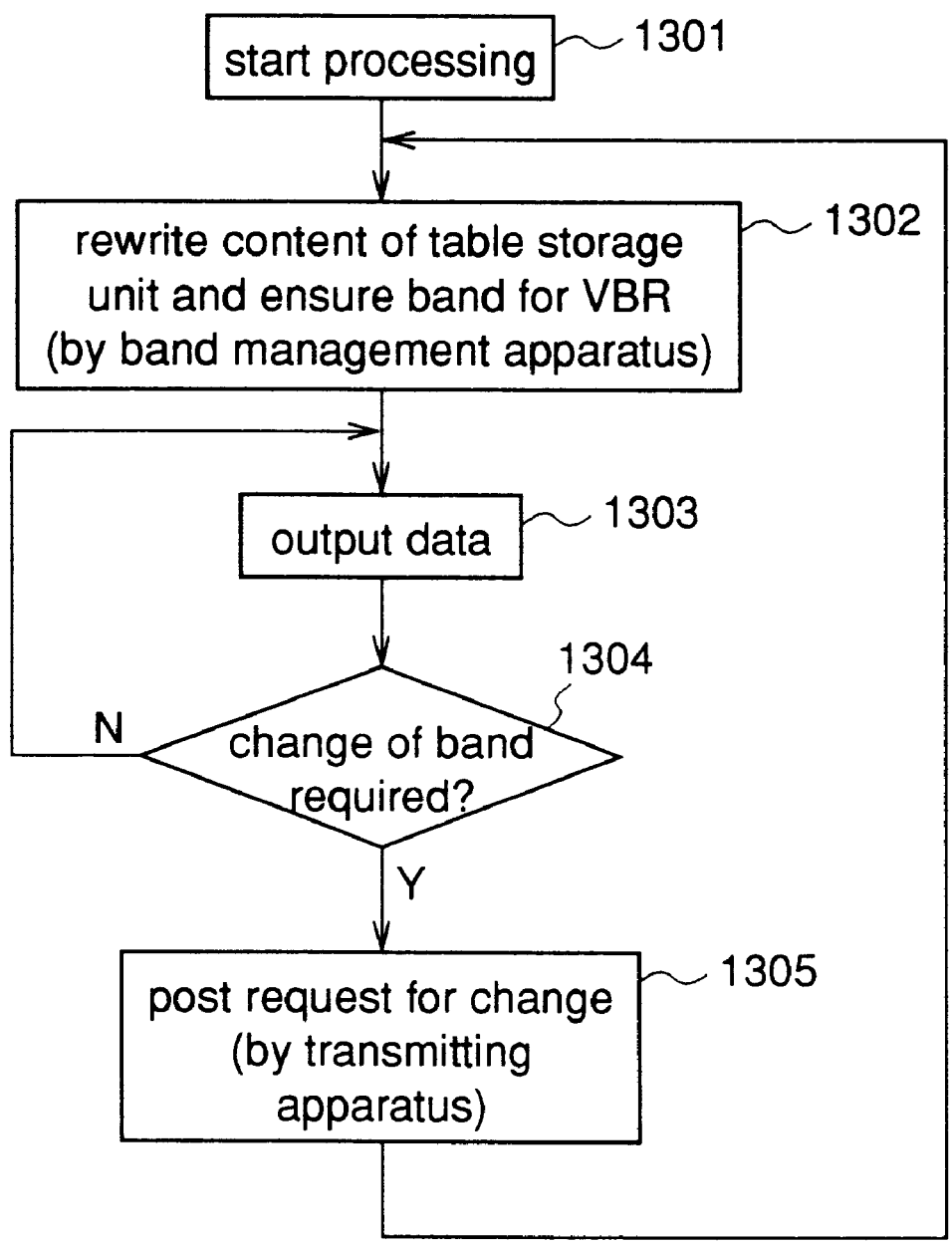
FIG. 13 is a flowchart showing a procedure for dynamically allocating the number of packets according to a prior art.

FIG. 9 shows flow of such bandwidth maximizing process. In Step 901, processing is started. In Step 902, the band management apparatus 104 sets the number of the upper limit value packets to "0", and in Step 903, it detects a data packet on the network 101. When the detected packet is a packet for the specified transmitting/receiving system and the amount of the packet data is not smaller than the upper limit value in Step 904, the number of the upper limit value packets is increased by "1" in Step 905. This operation is repeated until the end of the cycle in Step 906.

Upon completion of the cycle, in Step 907, it is decided whether or not the number of the upper limit value packets is not smaller than a specified value. When decided that the number is not smaller than the specified value, in Step 908, the content of the table storage unit is rewritten and the bandwidth to-be-allocated is set to the maximum value. When decided that the number is smaller than the specified value, in step 909, the same processing performed in any of the first, second, and third embodiments is carried out.

Figure 15:
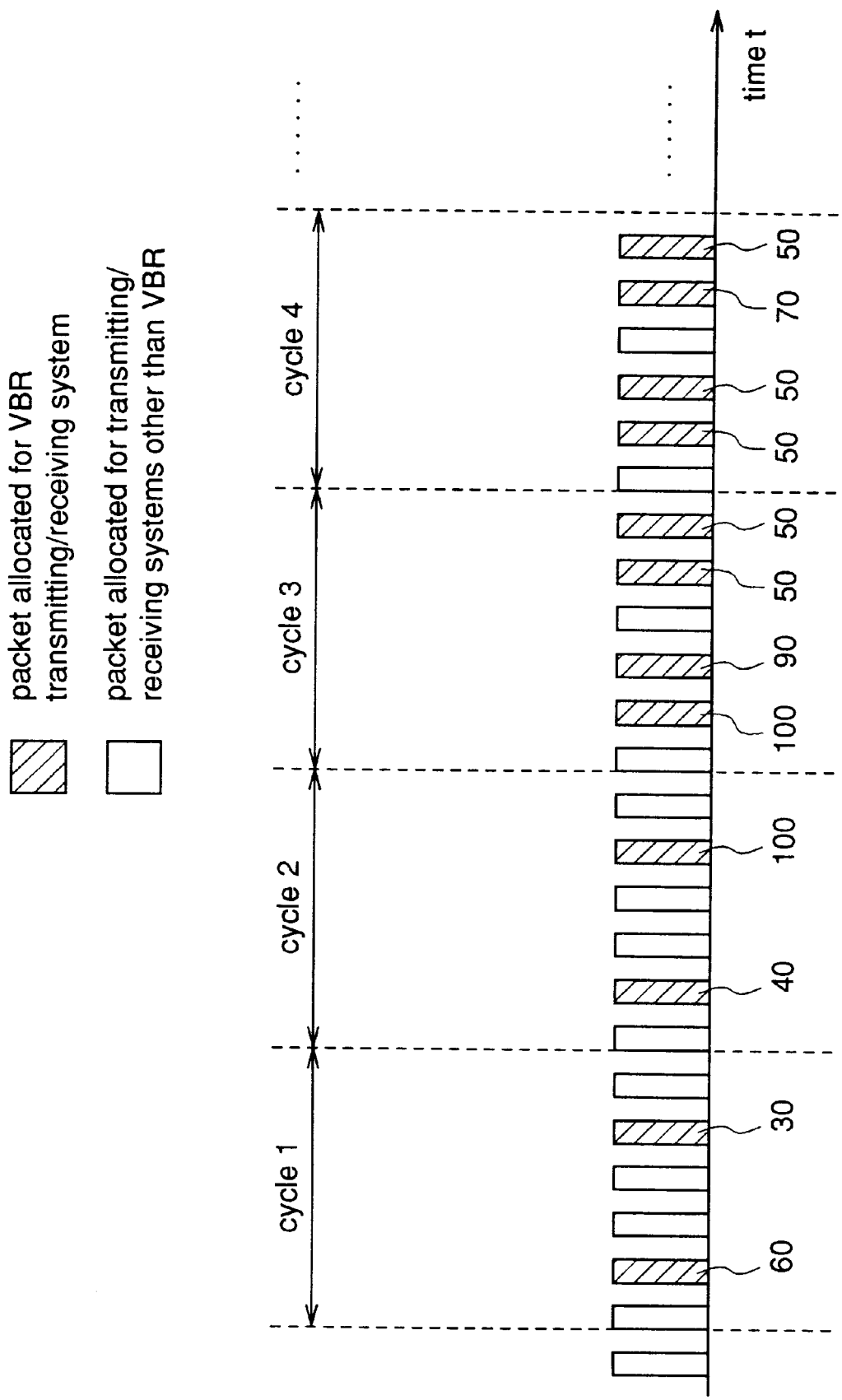
FIG. 15 is a diagram showing temporal change of the number of packets according to a fourth embodiment of the present invention.

FIG. 15 shows temporal change of the number of allocated packets according to this embodiment.

In FIG. 15, packets represented by oblique lines are packets for the VBR transmitting/receiving system and the others are packets allocated for systems other than the VBR transmitting/receiving system, a lateral axis indicates time, and numerals under the packets allocated for the VBR transmitting/receiving system indicate amount of data in the packets. Here it is assumed that one cycle is a time period for 6 packets, and the specified number of the upper limit value packets, the upper limit value, and the maximum value of the packets to-be-allocated are "1", "90", and "4", respectively. The packet allocation is performed according to the table in FIG. 6 except that at the detection of the upper limit value packets.

Since the amount of cycle data is "90" in cycle 1, the number of the packets to-be-allocated is "2" in cycle 2 according to the table. In cycle 2, the number of the upper limit value packets is "2", and is not smaller than the specified number, so that the number of the packets to-be-allocated in cycle 3 is "4" (maximum value).

Thus, in accordance with the fourth embodiment, the band management apparatus determines the upper limit value of the amount of data in the packet for the specified transmitting/receiving system, the data of the amount exceeding the upper limit value being written onto the packet when the amount of data stored in the buffer of the transmitting apparatus has exceeded the specified threshold, and sets the bandwidth to the maximum value immediately after detecting the packets containing data of the amount exceeding the upper limit value of the specified number or more in one cycle. The operation of the band management apparatus improves response of the bandwidth change for the case where the data rate rapidly changes.

While in the fourth embodiment the band management apparatus outputs the inquiry packet to which the transmission ID has been added, and thereby controls the number of packets, i.e., the bandwidth to-be-allocated, another method may be employed. For instance, the band management apparatus may post a time table for packets to the transmitting apparatus, and according to the time table, the transmitting apparatus may output the packets. Also in this case, the same effects are provided by detecting amount of data, posting an updated time table to the transmitting apparatus when the amount of data has changed, and changing the bandwidth to be allocated by the use of the band management apparatus.

While in the fourth embodiment the number of the packets to-be-allocated is set to the maximum value immediately after detecting the packet containing data of the amount of the upper limit value or more which is not smaller than the specified number, the band management apparatus may determine an averaged upper limit value, compute the average amount (per packet) in a cycle, and set the number of packets to-be-allocated to the maximum value immediately after the average has become the averaged upper limit value or more.

In addition, the number of packets to-be-allocated may be set to be the maximum value immediately after one packet containing data of the amount of the upper limit value or more is detected.

While in the fourth embodiment rapid increase in the rate of the transmitting apparatus is detected according to the threshold of the amount of data in the buffer, a rate measurement device may be connected to a data input unit for detecting rapid increase in the rate which is to be posted to the packet creating unit.

Besides, while the fourth embodiment uses one VBR transmitting/receiving system, two or more systems may be implemented in the same manner.

Further, while in the fourth embodiment, the number of packets is set to the maximum value in a subsequent cycle, this may be performed in a cycle that comes after the subsequent or the following cycle.

As should be appreciated from the foregoing description, in accordance with the present invention, in the network system where the band management apparatus manages the bandwidth to be used in each transmitting/receiving system, the band management apparatus monitors amount of data in the packets for the specified transmitting/receiving system, and increases/reduces the bandwidth to-be-allocated for the specified transmitting/receiving system according to increase/decrease in the amount of data. Thereby, it is possible to dynamically change bandwidth allocation without the necessity of preparing another procedure for posting the request for bandwidth change and thereby improve the efficiency in the use of the band.

What is claimed is:

1. A network system for use with a network, said network system comprising:

at least one transmitting apparatus to be connected to the network and operable to output packets containing data onto the network;

at least one receiving apparatus to be connected to the network and operable to receive from the network the packets that have been output from said at least one transmitting apparatus, wherein said at least one transmitting apparatus and said at least one receiving apparatus make up one or more transmitting/receiving systems;

data packet monitoring means for monitoring the packets transmitted through the network and for detecting from among the monitored packets an amount of data in specified packets, which are specified to be used by a specified transmitting/receiving system; and band managing means for determining a bandwidth on the network to be used by the specified transmitting/receiving system based on the amount of data in the specified packets detected by said data packet monitoring means;

wherein, said band management means determines cycles at regular time intervals, and controls the bandwidth to be allocated for the specified transmitting/receiving system according to the amount of data in the specified packets detected by said data packet monitoring means in one cycle; and wherein, said band management means adds the amount of data in the specified packets for the specified transmitting/receiving system that is detected by said data packet monitoring means in one cycle to produce an addition result, increases the bandwidth to be allocated for the specified transmitting/receiving system when the addition result in a current cycle is larger than the addition result in a previous cycle, and reduces the bandwidth when the addition result in the current cycle is smaller than the addition result in the previous cycle.

2. A network system for use with a network, said network system comprising:

at least one transmitting apparatus to be connected to the network and operable to output packets containing data onto the network;

at least one receiving apparatus to be connected to the network and operable to receive from the network the packets that have been output from said at least one transmitting apparatus, wherein said at least one transmitting apparatus and said at least one receiving apparatus make up one or more transmitting/receiving systems;

data packet monitoring means for monitoring the packets transmitted through the network and for detecting from among the monitored packets an amount of data in specified packets, which are specified to be used by a specified transmitting/receiving system; and band managing means for determining a bandwidth on the network to be used by the specified transmitting/receiving system based on the amount of data in the specified packets detected by said data packet monitoring means;

wherein, said band management means determines cycles at regular time intervals, and controls the bandwidth to be allocated for the specified transmitting/receiving system according to the amount of data in the specified packets detected by said data packet monitoring means in one cycle; and wherein, said band management means holds a reference value of an averaged amount of data per packet, computes the averaged amount of data per packet from the amount of data in the specified packets for the specified transmitting/receiving system detected by said data monitoring means in one cycle, increases the bandwidth to be allocated for the specified transmitting/receiving system when the computed averaged amount of data is not smaller than the reference value, and reduces the bandwidth when the computed averaged amount of data is smaller than the reference value.

3. A network system for use with a network, said network system comprising:

at least one transmitting apparatus to be connected to the network and operable to output packets containing data onto the network;

at least one receiving apparatus to be connected to the network and operable to receive from the network the packets that have been output from said at least one transmitting apparatus, wherein said at least one transmitting apparatus and said at least one receiving apparatus make up one or more transmitting/receiving systems;

data packet monitoring means for monitoring the packets transmitted through the network and for detecting from among the monitored packets an amount of data in specified packets, which are specified to be used by a specified transmitting/receiving system; and band managing means for determining a bandwidth on the network to be used by the specified transmitting/receiving system based on the amount of data in the specified packets detected by said data packet monitoring means;

wherein, said band management means determines cycles at regular time intervals, and controls the bandwidth to be allocated for the specified transmitting/receiving system according to the amount of data in the specified packets detected by said data packet monitoring means in one cycle; and wherein, said band management means holds a reference value of the amount of data per packet, increases the bandwidth to be allocated for the specified transmitting/receiving system when the amount of data in a last specified packet for the specified transmitting/receiving system detected by said data packet monitoring system in one cycle is not smaller than the reference value, and reduces the bandwidth when the amount of data is smaller than the reference value.

4. A network system for use with a network, said network system comprising:

at least one transmitting apparatus to be connected to the network and operable to output packets containing data onto the network;

at least one receiving apparatus to be connected to the network and operable to receive from the network the packets that have been output from said at least one transmitting apparatus, wherein said at least one transmitting apparatus and said at least one receiving apparatus make up one or more transmitting/receiving systems;

data packet monitoring means for monitoring the packets transmitted through the network and for detecting from among the monitored packets an amount of data in specified packets, which are specified to be used by a specified transmitting/receiving system; and band managing means for determining a bandwidth on the network to be used by the specified transmitting/receiving system based on the amount of data in the specified packets detected by said data packet monitoring means;

wherein, said band management means determines cycles at regular time intervals, and controls the bandwidth to be allocated for the specified transmitting/receiving system according to the amount of data in the specified packets detected by said data packet monitoring means in one cycle; and wherein said transmitting apparatus comprises:

a data input unit for inputting data;

a buffer for temporarily storing data input from said data input unit; and a packet creating unit for controlling the amount of data to be written onto an output packet, which is to be output by said transmitting apparatus, according to the amount of data stored in said buffer when the data is read from said buffer and written onto the output packet, and for outputting the output packet toward the network.

5. The network system of claim 4 wherein said packet creating unit holds an upper limit value of the amount of data to be written onto the output packet and a threshold of the amount of data to be stored in said buffer, and writes data of the amount of the upper limit value or more onto the output packet when the amount of data to be stored in said buffer is not smaller than the threshold, and said band management means, immediately after detecting at least one packet containing data of the amount of the upper limit value or more for the specified transmitting/receiving system per cycle, sets the bandwidth to be allocated for the specified transmitting/receiving system to a maximum value.

6. A network system for use with a network, said network system comprising:

at least one transmitting apparatus to be connected to the network and operable to output packets containing data onto the network;

at least one receiving apparatus to be connected to the network and operable to receive from the network the packets that have been output from said at least one transmitting apparatus, wherein said at least one transmitting apparatus and said at least one receiving apparatus make up one or more transmitting/receiving systems;

data packet monitoring means for monitoring the packets transmitted through the network and for detecting from among the monitored packets an amount of data in specified packets, which are specified to be used by a specified transmitting/receiving system; and band managing means for determining a bandwidth on the network to be used by the specified transmitting/ receiving system based on the amount of data in the specified packets detected by said data packet monitoring means;

wherein, said band management means determines cycles at regular time intervals, and controls the bandwidth to be allocated for the specified transmitting/receiving system according to the amount of data in the specified packets detected by said data packet monitoring means in one cycle; and wherein, said band management means holds a packet-data averaged upper limit value, and sets the bandwidth to be allocated for the specified transmitting/receiving system to a maximum value immediately after an averaged amount of data per packet for the specified transmitting/receiving system in one cycle has become the packet-data averaged upper limit value or more.

7. A band management unit for use in a network system including a network, at least one transmitting apparatus connected to the network and operable to output packets containing data onto the network, at least one receiving apparatus connected to the network and operable to receive from the network the packets that have been output from the at least one transmitting apparatus, wherein the at least one transmitting apparatus and the at least one receiving apparatus make up one or more transmitting/receiving systems, said band management unit comprising:

a data packet monitoring unit for monitoring the packets transmitted through the network and for detecting from among the monitored packets an amount of data in specified packets, which are to be used by a specified transmitting/receiving system; and band management unit for determining a bandwidth on the network to be used by the specified transmitting/receiving system based on the amount of data in the specified packets detected by said data packet monitoring unit;

wherein said band management unit determines cycles at regular time intervals, and controls the bandwidth to be allocated for the specified transmitting/receiving system according to the amount of data in the specified packets detected by said data packet monitoring unit in one cycle; and wherein, said band management unit adds the amount of data in the specified packets detected by said data packet monitoring unit in one cycle to produce an addition result, increases the bandwidth to be allocated for the specified transmitting/receiving system when the addition result in a current cycle is larger than the addition result in a previous cycle, and reduces the bandwidth when the addition result in the current cycle is smaller than the addition result in the previous cycle.

8. A band management unit for use in a network system including a network, at least one transmitting apparatus connected to the network and operable to output packets containing data onto the network, at least one receiving apparatus connected to the network and operable to receive from the network the packets that have been output from the at least one transmitting apparatus, wherein the at least one transmitting apparatus and the at least one receiving apparatus make up one or more transmitting/receiving systems, said band management unit comprising:

a data packet monitoring unit for monitoring the packets transmitted through the network and for detecting from among the monitored packets an amount of data in specified packets, which are to be used by a specified transmitting/receiving system; and a band management unit for determining a bandwidth on the network to be used by the specified transmitting/receiving system based on the amount of data in the specified packets detected by said data packet monitoring unit;

wherein said band management unit determines cycles at regular time intervals, and controls the bandwidth to be allocated for the specified transmitting/receiving system according to the amount of data in the specified packets detected by said data packet monitoring unit in one cycle; and wherein, said band management unit holds a reference value of averaged amount of data per packet, computes an averaged amount of data per packet from the amount of data in the specified packets detected by said data packet monitoring unit in one cycle, increases the bandwidth to be allocated for the specified transmitting/receiving system when the computed averaged amount of data is not smaller than the reference value, and reduces the bandwidth when the computed averaged amount of data is smaller than the reference value.

9. A band management unit for use in a network system including a network, at least one transmitting apparatus connected to the network and operable to output packets containing data onto the network, at least one receiving apparatus connected to the network and operable to receive from the network the packets that have been output from the at least one transmitting apparatus, wherein the at least one transmitting apparatus and the at least one receiving apparatus make up one or more transmitting/receiving systems, said band management unit comprising:

a data packet monitoring unit for monitoring the packets transmitted through the network and for detecting from among the monitored packets an amount of data in specified packets, which are to be used by a specified transmitting/receiving system; and a band management unit for determining a bandwidth on the network to be used by the specified transmitting/receiving system based on the amount of data in the specified packets detected by said data packet monitoring unit;

wherein said band management unit determines cycles at regular time intervals, and controls the bandwidth to be allocated for the specified transmitting/receiving system according to the amount of data in the specified packets detected by said data packet monitoring unit in one cycle; and wherein said band management unit holds a reference value of the amount of data per packet, increases the bandwidth to be allocated for the specified transmitting/receiving system when the amount of data in a last packet for the specified transmitting/receiving system detected by said data packet monitoring unit in one cycle is not smaller than the reference value, and reduces the bandwidth when the amount of data is smaller than the reference value.

10. A band management unit for use in a network system including a network, at least one transmitting apparatus connected to the network and operable to output packets containing data onto the network, at least one receiving apparatus connected to the network and operable to receive from the network the packets that have been output from the at least one transmitting apparatus, wherein the at least one transmitting apparatus and the at least one receiving apparatus make up one or more transmitting/receiving systems, said band management unit comprising:

a data packet monitoring unit for monitoring the packets transmitted through the network and for detecting from among the monitored packets an amount of data in specified packets, which are to be used by a specified transmitting/receiving system; and a band management unit for determining a bandwidth on the network to be used by the specified transmitting/receiving system based on the amount of data in the specified packets detected by said data packet monitoring unit;

wherein said band management unit holds a maximum value and a minimum value of a bandwidth to be allocated for the specified transmitting/receiving system, sets the bandwidth to be allocated for the specified transmitting/receiving system to the minimum value when the amount of data in a current specified packet detected by said data packet monitoring unit is zero, and sets the bandwidth to the maximum value when the amount of data in the current specified packet detected by said data packet monitoring unit is not zero; and wherein, said band management unit, immediately after detecting at least one specified packet containing data of an amount of an upper limit value or more for the specified transmitting/receiving system per cycle, sets the bandwidth to be allocated for the specified transmitting/receiving system to the maximum value.

11. A band management unit for use in a network system including a network, at least one transmitting apparatus connected to the network and operable to output packets containing data onto the network, at least one receiving apparatus connected to the network and operable to receive from the network the packets that have been output from the at least one transmitting apparatus, wherein the at least one transmitting apparatus and the at least one receiving apparatus make up one or more transmitting/receiving systems, said band management unit comprising:

a data packet monitoring unit for monitoring the packets transmitted through the network and for detecting from among the monitored packets an amount of data in specified packets, which are to be used by a specified transmitting/receiving system; and a band management unit for determining a bandwidth on the network to be used by the specified transmitting/receiving system based on the amount of data in the specified packets detected by said data packet monitoring unit;

wherein said band management unit determines cycles at regular time intervals, and controls the bandwidth to be allocated for the specified transmitting/receiving system according to the amount of data in the specified packets detected by said data packet monitoring unit in one cycle; and wherein, said band management unit, immediately after detecting at least one specified packet containing data of an amount of an upper limit value or more for the specified transmitting/receiving system per cycle, sets the bandwidth to be allocated for the specified transmitting/receiving system to the maximum value.

12. A band management unit for use in a network system including a network, at least one transmitting apparatus connected to the network and operable to output packets containing data onto the network, at least one receiving apparatus connected to the network and operable to receive from the network the packets that have been output from the at least one transmitting apparatus, wherein the at least one transmitting apparatus and the at least one receiving apparatus make up one or more transmitting/receiving systems, said band management unit comprising:

a data packet monitoring unit for monitoring the packets transmitted through the network and for detecting from among the monitored packets an amount of data in specified packets, which are to be used by a specified transmitting/receiving system; and a band management unit for determining a bandwidth on the network to be used by the specified transmitting/receiving system based on the amount of data in the specified packets detected by said data packet monitoring unit;

wherein said band management unit holds a maximum value and a minimum value of a bandwidth to be allocated for the specified transmitting/receiving system, sets the bandwidth to be allocated for the specified transmitting/receiving system to the minimum value when the amount of data in a current specified packet detected by said data packet monitoring unit is zero, and sets the bandwidth to the maximum value when the amount of data in the current specified packet detected by said data packet monitoring unit is not zero; and wherein, said band management unit holds an averaged upper limit value of data per packet, and sets the bandwidth to be allocated for the specified transmitting/receiving system to the maximum value immediately after an averaged amount of data per packet for the specified transmitting/receiving system has become the averaged upper limit value or more.

13. A band management unit for use in a network system including a network, at least one transmitting apparatus connected to the network and operable to output packets containing data onto the network, at least one receiving apparatus connected to the network and operable to receive from the network the packets that have been output from the at least one transmitting apparatus, wherein the at least one transmitting apparatus and the at least one receiving apparatus make up one or more transmitting/receiving systems, said band management unit comprising:

a data packet monitoring unit for monitoring the packets transmitted through the network and for detecting from among the monitored packets an amount of data in specified packets, which are to be used by a specified transmitting/receiving system; and a band management unit for determining a bandwidth on the network to be used by the specified transmitting/receiving system based on the amount of data in the specified packets detected by said data packet monitoring unit;

wherein said band management unit determines cycles at regular time intervals, and controls the bandwidth to be allocated for the specified transmitting/receiving system according to the amount of data in the specified packets detected by said data packet monitoring unit in one cycle; and wherein, said band management unit holds an averaged upper limit value of data per packet, and sets the bandwidth to be allocated for the specified transmitting/receiving system to the maximum value immediately after an averaged amount of data per packet for the specified transmitting/receiving system has become the averaged upper limit value or more.

14. A network transmitting method for use with a network system which includes at least one transmitting apparatus connected to a network for outputting packets containing data onto the network and at least one receiving apparatus connected to the network for receiving from the network the packets which have been output from the at least one transmitting apparatus, wherein the at least one transmitting apparatus and the at least one receiving apparatus make up plural transmitting/receiving systems, said method comprising:

monitoring the packets transmitted through the network;

detecting from among the monitored packets an amount of data in specified packets, which are specified to be used by a specified transmitting/receiving system; and determining a bandwidth on the network to be used by the specified transmitting/receiving system based on the detected amount of data in the specified packets.

15. A network transmitting method for use with a network system which includes at least one transmitting apparatus connected to a network for outputting packets containing data onto the network and at least one receiving apparatus connected to the network for receiving from the network the packets which have been output from the at least one transmitting apparatus, wherein the at least one transmitting apparatus and the at least one receiving apparatus make up plural transmitting/receiving systems, said method comprising:

monitoring the packets transmitted through the network;

detecting from among the monitored packets an amount of data in specified packets, which are specified to be used by a specified transmitting/receiving system;

determining a bandwidth on the network to be used by the specified transmitting/receiving system based on the detected amount of data in the specified packets;

determining cycles at regular time intervals each comprising at least one packet;

controlling the bandwidth to be allocated for the specified transmitting/receiving system according to the amount of data for the specified system per cycle; and increasing the bandwidth to be allocated for the specified transmitting/receiving system when the amount of data per cycle is larger than the amount of data in a previous cycle, and reducing the bandwidth when the amount of data per cycle is smaller than the amount cycle.

16. A network transmitting method for use with a network system which includes at least one transmitting apparatus connected to a network for outputting packets containing data onto the network and at least one receiving apparatus connected to the network for receiving from the network the packets which have been output from the at least one transmitting apparatus, wherein the at least one transmitting apparatus and the at least one receiving apparatus make up plural transmitting/receiving systems, said method comprising:

monitoring the packets transmitted through the network;

detecting from among the monitored packets an amount of data in specified packets, which are specified to be used by a specified transmitting/receiving system;

determining a bandwidth on the network to be used by the specified transmitting/receiving system based on the detected amount of data in the specified packets;

determining cycles at regular time intervals each comprising at least one packet;

controlling the bandwidth to be allocated for the specified transmitting/receiving system according to the amount of data for the specified system per cycle;

storing a reference value of averaged amount of data;

computing an averaged amount of data for the specified transmitting/receiving system per cycle; and increasing the bandwidth to be allocated for the specified transmitting/receiving system when the computed averaged amount of data is not smaller than the reference value, and reducing the bandwidth when the computed averaged amount is smaller than the reference value.

17. A network transmitting method for use with a network system which includes at least one transmitting apparatus connected to a network for outputting packets containing data onto the network and at least one receiving apparatus connected to the network for receiving from the network the packets which have been output from the at least one transmitting apparatus, wherein the at least one transmitting apparatus and the at least one receiving apparatus make up plural transmitting/receiving systems, said method comprising:

monitoring the packets transmitted through the network;

detecting from among the monitored packets an amount of data in specified packets, which are specified to be used by a specified transmitting/receiving system;

determining a bandwidth on the network to be used by the specified transmitting/receiving system based on the detected amount of data in the specified packets;

determining cycles at regular time intervals each comprising at least one packet;

controlling the bandwidth to be allocated for the specified transmitting/receiving system according to the amount of data for the specified system per cycle; and storing a reference value of the amount of data per packet, increasing the bandwidth to be allocated for the specified transmitting/receiving system when the detected amount of data in a last packet for the specified transmitting/receiving system in one cycle is not smaller than the reference value, and reducing the bandwidth when the detected amount of data in the last packet is smaller than the reference value.

18. A network transmitting method for use with a network system which includes at least one transmitting apparatus connected to a network for outputting packets containing data onto the network and at least one receiving apparatus connected to the network for receiving from the network the packets which have been output from the at least one transmitting apparatus, wherein the at least one transmitting apparatus and the at least one receiving apparatus make up plural transmitting/receiving systems, said method comprising:

monitoring the packets transmitted through the network;

detecting from among the monitored packets an amount of data in specified packets, which are specified to be used by a specified transmitting/receiving system;

determining a bandwidth on the network to be used by the specified transmitting/receiving system based on the detected amount of data in the specified packets;

determining cycles at regular time intervals each comprising at least one packet;

controlling the bandwidth to be allocated for the specified transmitting/receiving system according to the amount of data for the specified system per cycle; and controlling the amount of data to be written onto the packet according to an amount of data stored in the transmitting apparatus.

19. The network transmitting method of claim 18 further comprising:

determining an upper limit value of the amount of data written onto the packet and a threshold of the amount of data stored in the transmitting apparatus when the transmitting apparatus transmits a packet containing data;

writing, with the transmitting apparatus, data of the amount of the upper limit value or more onto the packet immediately after storing data of the amount of the threshold or more in the transmitting apparatus; and setting the bandwidth to be allocated for the specified transmitting/receiving system to a maximum value when at least one packet containing the amount of data exceeding the upper limit value on the network is detected in one cycle.

20. A network transmitting method for use with a network system which includes at least one transmitting apparatus connected to a network for outputting packets containing data onto the network and at least one receiving apparatus connected to the network for receiving from the network the packets which have been output from the at least one transmitting apparatus, wherein the at least one transmitting apparatus and the at least one receiving apparatus make up plural transmitting/receiving systems, said method comprising:

monitoring the packets transmitted through the network;

detecting from among the monitored packets an amount of data in specified packets, which are specified to be used by a specified transmitting/receiving system;

determining a bandwidth on the network to be used by the specified transmitting/receiving system based on the detected amount of data in the specified packets;

determining cycles at regular time intervals each comprising at least one packet;

controlling the bandwidth to be allocated for the specified transmitting/receiving system according to the amount of data for the specified system per cycle;

determining an averaged upper limit value of the amount of data contained per packet; and setting the bandwidth to be allocated for the specified transmitting/receiving system to a maximum value immediately after the amount of data per packet for the specified transmitting/receiving system in one cycle has become the averaged upper limit value or more.

21. A band management method for use with a network system including a network, at least one transmitting apparatus connected to the network for outputting packets containing data onto the network, and at least one receiving apparatus connected to the network for receiving from the network the packets that have been output from the at least one transmitting apparatus, wherein the at least one transmitting apparatus and the at least one receiving apparatus make up plural transmitting/receiving systems, said band management method being for managing a bandwidth on the network used by at least one of the transmitting/receiving systems, said method comprising:

monitoring the packets transmitted through the network;

detecting from among the monitored packets an amount of data in specified packets, which are to be used by a specified transmitting/receiving system;

determining a bandwidth on the network to be used by the specified transmitting/receiving system based on the detected amount of data;

determining cycles at regular time intervals each comprising at least one of the packets;

controlling the bandwidth to be allocated for the specified transmitting/receiving system according to the amount of data for the specified transmitting/receiving system per cycle; and increasing the bandwidth to be allocated for the specified transmitting/receiving system when the amount of data per cycle is larger than the amount of data in a previous cycle, and reducing the bandwidth when the amount of data per cycle is smaller than the amount in the previous cycle.

22. The band management method of claim 21 further comprising:

storing a table of correspondences between amount of data and allocated bandwidths;

computing the amount of data to be allocated for the specified transmitting/receiving system per cycle; and finding the bandwidths to be allocated corresponding to the amount of data according to the table.

23. A band management method for use with a network system including a network, at least one transmitting apparatus connected to the network for outputting packets containing data onto the network, and at least one receiving apparatus connected to the network for receiving from the network the packets that have been output from the at least one transmitting apparatus, wherein the at least one transmitting apparatus and the at least one receiving apparatus make up plural transmitting/receiving systems, said band management method being for managing a bandwidth on the network used by at least one of the transmitting/receiving systems, said method comprising:

monitoring the packets transmitted through the network;

detecting from among the monitored packets an amount of data in specified packets, which are to be used by a specified transmitting/receiving system;

determining a bandwidth on the network to be used by the specified transmitting/receiving system based on the detected amount of data;

determining cycles at regular time intervals each comprising at least one of the packets;

controlling the bandwidth to be allocated for the specified transmitting/receiving system according to the amount of data for the specified transmitting/receiving system per cycle;

storing a reference value of an averaged amount of data;

computing the averaged amount of data for the specified transmitting/receiving system per cycle; and increasing the bandwidth to be allocated for the specified transmitting/receiving system when the averaged amount of data is not smaller than the reference value, and reducing the bandwidth when the averaged amount is smaller than the reference value.

24. A band management method for use with a network system including a network, at least one transmitting apparatus connected to the network for outputting packets containing data onto the network, and at least one receiving apparatus connected to the network for receiving from the network the packets that have been output from the at least one transmitting apparatus, wherein the at least one transmitting apparatus and the at least one receiving apparatus make up plural transmitting/receiving systems, said band management method being for managing a bandwidth on the network used by at least one of the transmitting/receiving systems, said method comprising:

monitoring the packets transmitted through the network;

detecting from among the monitored packets an amount of data in specified packets, which are to be used by a specified transmitting/receiving system;

determining a bandwidth on the network to be used by the specified transmitting/receiving system based on the detected amount of data;

determining cycles at regular time intervals each comprising at least one of the packets;

controlling the bandwidth to be allocated for the specified transmitting/receiving system according to the amount of data for the specified transmitting/receiving system per cycle;

storing a reference value of the amount of data per packet; and increasing the bandwidth to be allocated for the specified transmitting/receiving system when the detected amount of data in a last packet for the specified transmitting/receiving system in one cycle is not smaller than the reference value, and reducing the bandwidth when the detected amount is smaller than the reference value.

25. A band management method for use with a network system including a network, at least one transmitting apparatus connected to the network for outputting packets containing data onto the network, and at least one receiving apparatus connected to the network for receiving from the network the packets that have been output from the at least one transmitting apparatus, wherein the at least one transmitting apparatus and the at least one receiving apparatus make up plural transmitting/receiving systems, said band management method being for managing a bandwidth on the network used by at least one of the transmitting/receiving systems, said method comprising:

monitoring the packets transmitted through the network;

detecting from among the monitored packets an amount of data in specified packets, which are to be used by a specified transmitting/receiving system;

determining a bandwidth on the network to be used by the specified transmitting/receiving system based on the detected amount of data;

determining cycles at regular time intervals each comprising at least one of the packets;

controlling the bandwidth to be allocated for the specified transmitting/receiving system according to the amount of data for the specified transmitting/receiving system per cycle;

determining an upper limit value of the amount of data to be written onto a packet; and setting the bandwidth to be allocated for the specified transmitting/receiving system to a maximum value when at least one packet that contains data of an amount exceeding the upper limit value is detected in one cycle.

26. A band management method for use with a network system including a network, at least one transmitting apparatus connected to the network for outputting packets containing data onto the network, and at least one receiving apparatus connected to the network for receiving from the network the packets that have been output from the at least one transmitting apparatus, wherein the at least one transmitting apparatus and the at least one receiving apparatus make up plural transmitting/receiving systems, said band management method being for managing a bandwidth on the network used by at least one of the transmitting/receiving systems, said method comprising:

monitoring the packets transmitted through the network;

detecting from among the monitored packets an amount of data in specified packets, which are to be used by a specified transmitting/receiving system;

determining a bandwidth on the network to be used by the specified transmitting/receiving system based on the detected amount of data;

determining cycles at regular time intervals each comprising at least one of the packets;

controlling the bandwidth to be allocated for the specified transmitting/receiving system according to the amount of data for the specified transmitting/receiving system per cycle;

determining an averaged upper limit value of the amount of data contained per packet; and setting the bandwidth to be allocated for the specified transmitting/receiving system to a maximum value immediately after the amount of data contained per packet for the specified system in one cycle has become the averaged upper limit value or more.

\* \* \* \* \*

UNITED STATES PATENT AND TRADEMARK OFFICE
CERTIFICATE OF CORRECTION

PATENT NO.     : 6,404,777 B1
DATED          : June 11, 2002
INVENTOR(S)    : Toshikazu Hattori et al.

It is certified that error appears in the above-identified patent and that said Letters Patent is hereby corrected as shown below:

<u>Title page,</u>
Item [56], FOREIGN PATENT DOCUMENTS, JP 10013415 01/1998 is missing from the patent.

<u>Column 13,</u>
Line 10, replace "procedure;" with -- procedure, --.

<u>Column 21,</u>
Line 32, insert -- a -- before "band management".

<u>Column 25,</u>
Line 42, insert -- in the previous -- after "amount".

Signed and Sealed this

Twenty-sixth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.   : 6,404,777 B1                                                   Page 1 of 1
DATED        : June 11, 2002
INVENTOR(S)  : Toshikazu Hattori et al.

It is certified that error appears in the above-identified patent and that said Letters Patent is hereby corrected as shown below:

Column 13,
Line 57, replace "not," with -- not --.

Signed and Sealed this

Twenty-fifth Day of February, 2003

JAMES E. ROGAN
*Director of the United States Patent and Trademark Office*